US012699669B2

(12) United States Patent
Guim Bernat et al.

(10) Patent No.: US 12,699,669 B2
(45) Date of Patent: Aug. 4, 2026

(54) FLEXIBLE RESOURCE SHARING IN A NETWORK

(71) Applicant: Intel Corporation, Santa Clara, CA (US)

(72) Inventors: Francesc Guim Bernat, Barcelona (ES); Karthik Kumar, Chandler, AZ (US); Susanne M. Balle, Hudson, NH (US); Andrzej Kuriata, Gdansk (PL); Duane Galbi, Wayland, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/958,140

(22) Filed: Sep. 30, 2022

(65) Prior Publication Data

US 2023/0029026 A1 Jan. 26, 2023

(51) Int. Cl.
*G06F 13/00* (2006.01)
*G06F 13/40* (2006.01)
*H04L 67/2866* (2022.01)

(52) U.S. Cl.
CPC ...... *G06F 13/4068* (2013.01); *H04L 67/2866* (2013.01)

(58) Field of Classification Search
CPC .......................... G06F 13/4068; H04L 67/2866
See application file for complete search history.

(56) References Cited

U.S. PATENT DOCUMENTS

| | | | | |
|---|---|---|---|---|
| 8,484,213 B2 * | 7/2013 | Wolafka | .............. | H04L 41/0226 |
| | | | | 709/212 |
| 2013/0332484 A1 * | 12/2013 | Gajic | .................... | G06F 16/285 |
| | | | | 707/E17.014 |
| 2019/0065426 A1 | 2/2019 | Sharma et al. | | |
| 2019/0095363 A1 | 3/2019 | Agarwal et al. | | |
| 2020/0192798 A1 | 6/2020 | Natu | | |
| 2021/0373951 A1 * | 12/2021 | Malladi | .................. | G06F 9/505 |
| 2023/0029026 A1 * | 1/2023 | Guim Bernat | ...... | G06F 13/4068 |

OTHER PUBLICATIONS

Wagh et al., Consortium, C. X. L. "Compute Express LinkTM (CXLTM) 2.0 Specification: Memory Pooling—Questions from the Webinar Part 1." Compute Express Link, May 3, 2021, https://www.computeexpresslink.org/post/compute-express-link-cxl-2-0-specification-memory-pooling-questions-from-the-webinar-part-1, 3 pages.

* cited by examiner

*Primary Examiner* — Henry Tsai
*Assistant Examiner* — Kim T Huynh
(74) *Attorney, Agent, or Firm* — Alliance IP, LLC

(57) ABSTRACT

A network processing device connects to one or more devices in a computing node and connects to one or more other network processing devices of other computing nodes. The network processing device identifies a policy for allowing devices in other computing nodes to access a particular resource of one of the devices in its computing node. The network processing device receives an access request to access the particular resource from another network processing device and sends a request to the device hosting the particular resource based on the access request and the policy.

22 Claims, 13 Drawing Sheets memory 605a 515a host 1

CPU
610a memory 605b 515b host 2

CPU
610b memory 605c 515n host #

CPU
610c

CXL cache

CXL cache

CXL cache

CXL switch
525

620
FPGA/ASIC

CPU
615

CXL.mem    writeback
memory

CXL.mem

CXL cache  CXL.mem accelerator attched memory (memory pool)
625

IPU    535
install as type 2 device

600

900

FLEXIBLE RESOURCE SHARING IN A NETWORK

FIELD

The present disclosure relates in general to the field of distributed computing systems, and more specifically, to data transfers within data center clusters.

BACKGROUND

A datacenter may include one or more platforms each comprising at least one processor and associated memory modules. Each platform of the datacenter may facilitate the performance of any suitable number of processes associated with various applications running on the platform. These processes may be performed by the processors and other associated logic of the platforms. Each platform may additionally include I/O controllers, such as network adapter devices, which may be used to send and receive data on a network for use by the various applications.

BRIEF DESCRIPTION OF THE DRAWINGS

Like reference numbers and designations in the various drawings indicate like elements.

DETAILED DESCRIPTION

Figure 1:
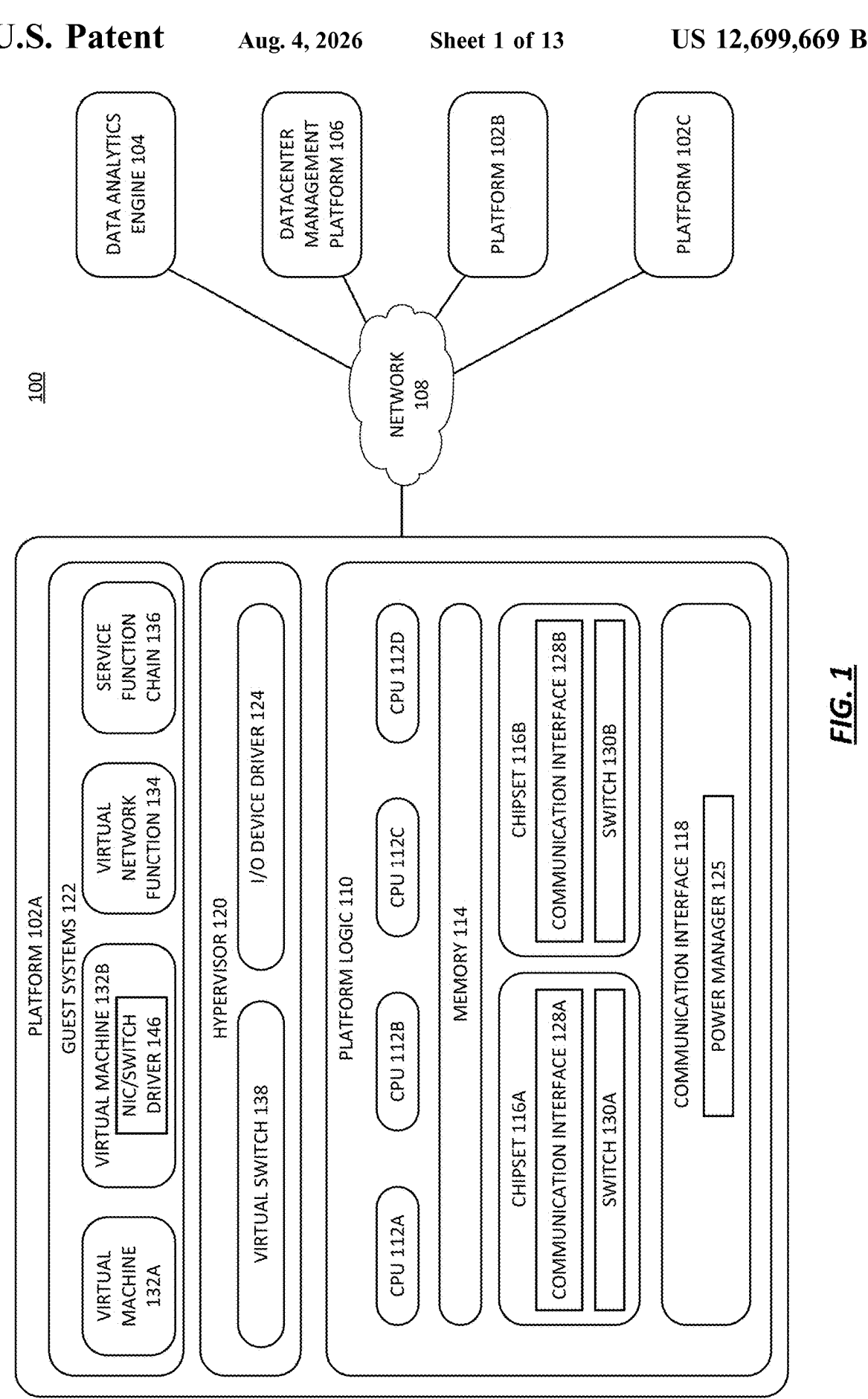
FIG. 1 illustrates a block diagram of components of a datacenter in accordance with certain embodiments.

FIG. 1 illustrates a block diagram of components of a datacenter 100 in accordance with certain embodiments. In the embodiment depicted, datacenter 100 includes a plurality of platforms 102, data analytics engine 104, and datacenter management platform 106 coupled together through network 108. A platform 102 may include platform logic 110 with one or more central processing units (CPUs) 112, memories 114 (which may include any number of different modules), chipsets 116, communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications. The platform may be logically or physically subdivided into clusters and these clusters may be enhanced through specialized networking accelerators and the use of Compute Express Link (CXL) memory semantics to make such cluster more efficient, among other example enhancements.

Each platform 102 may include platform logic 110. Platform logic 110 comprises, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, compossible servers, disaggregated servers, or other suitable structures that comprises multiple platforms coupled together through network 108 (which may comprise, e.g., a rack or backplane switch).

CPUs 112 may each comprise any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removably coupled to platform 102. Although four CPUs are shown, a platform 102 may include any suitable number of CPUs.

Memory 114 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long-term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also comprise storage for instructions that may be executed by the cores of CPUs 112 or other processing elements (e.g., logic resident on chipsets 116) to provide functionality associated with components of platform logic 110. Additionally or alternatively, chipsets 116 may each comprise memory that may have any of the characteristics described herein with respect to memory 114. Memory 114 may also store the results and/or intermediate results of the various calculations and determinations performed by CPUs 112 or processing elements on chipsets 116. In various embodiments, memory 114 may comprise one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 comprising any suitable logic to support the operation of the CPUs 112. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via integrated I/O controllers resident on each CPU.

Chipsets 116 may each include one or more communication interfaces 128. Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 may be implemented through one or more I/O controllers, such as one or more physical network interface controllers (NICs), also known as network interface cards or network adapters. An I/O controller may include electronic circuitry to communicate using any suitable physical layer and data link layer standard such as Ethernet (e.g., as defined by an IEEE 802.3 standard), Fibre Channel, InfiniBand, Wi-Fi, or other suitable standard. An I/O controller may include one or more physical ports that may couple to a cable (e.g., an Ethernet cable). An I/O controller may enable communication between any suitable element of chipset 116 (e.g., switch 130) and another device coupled to network 108. In some embodiments, network 108 may comprise a switch with bridging and/or routing functions that is external to the platform 102 and operable to couple various I/O controllers (e.g., NICs) distributed throughout the datacenter 100 (e.g., on different platforms) to each other. In various embodiments an I/O controller may be integrated with the chipset (e.g., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 according to one or more link or interconnect protocols, such as Peripheral Component Interconnect Express (PCIe), Compute Express Link (CXL), HyperTransport, GenZ, OpenCAPI, and others, which may each alternatively or collectively apply the general principles and/or specific features discussed herein. Switch 130 may be a physical or virtual (e.g., software) switch.

Platform logic 110 may include an additional communication interface 118. Similar to communication interface 128, communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 comprises one or more physical I/O controllers (e.g., NICs). These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112). Further, as discussed herein, I/O controllers may include a power manager 125 to implement power consumption management functionality at the I/O controller (e.g., by automatically implementing power savings at one or more interfaces of the communication interface 118 (e.g., a PCIe interface coupling a NIC to another element of the system), among other example features.

Platform logic 110 may receive and perform any suitable types of processing requests. A processing request may include any request to utilize one or more resources of platform logic 110, such as one or more cores or associated logic. For example, a processing request may comprise a processor core interrupt; a request to instantiate a software component, such as an I/O device driver 124 or virtual machine 132; a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may comprise a single virtual machine (e.g., virtual machine 132a or 132b) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132b may be paravirtualized. For example, the virtual machine 132b may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may comprise a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining may provide the ability to define an ordered list of network services (e.g., firewalls, load balancers) that are stitched together in the network to create a service chain.

A hypervisor 120 (also known as a virtual machine monitor) may comprise logic to create and run guest systems 122. The hypervisor 120 may present guest operating systems run by virtual machines with a virtual operating platform (e.g., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may comprise a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may comprise a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the data system 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, guest systems 122 may communicate with nodes that are external to the datacenter 100 through network 108.

Figure 2A:
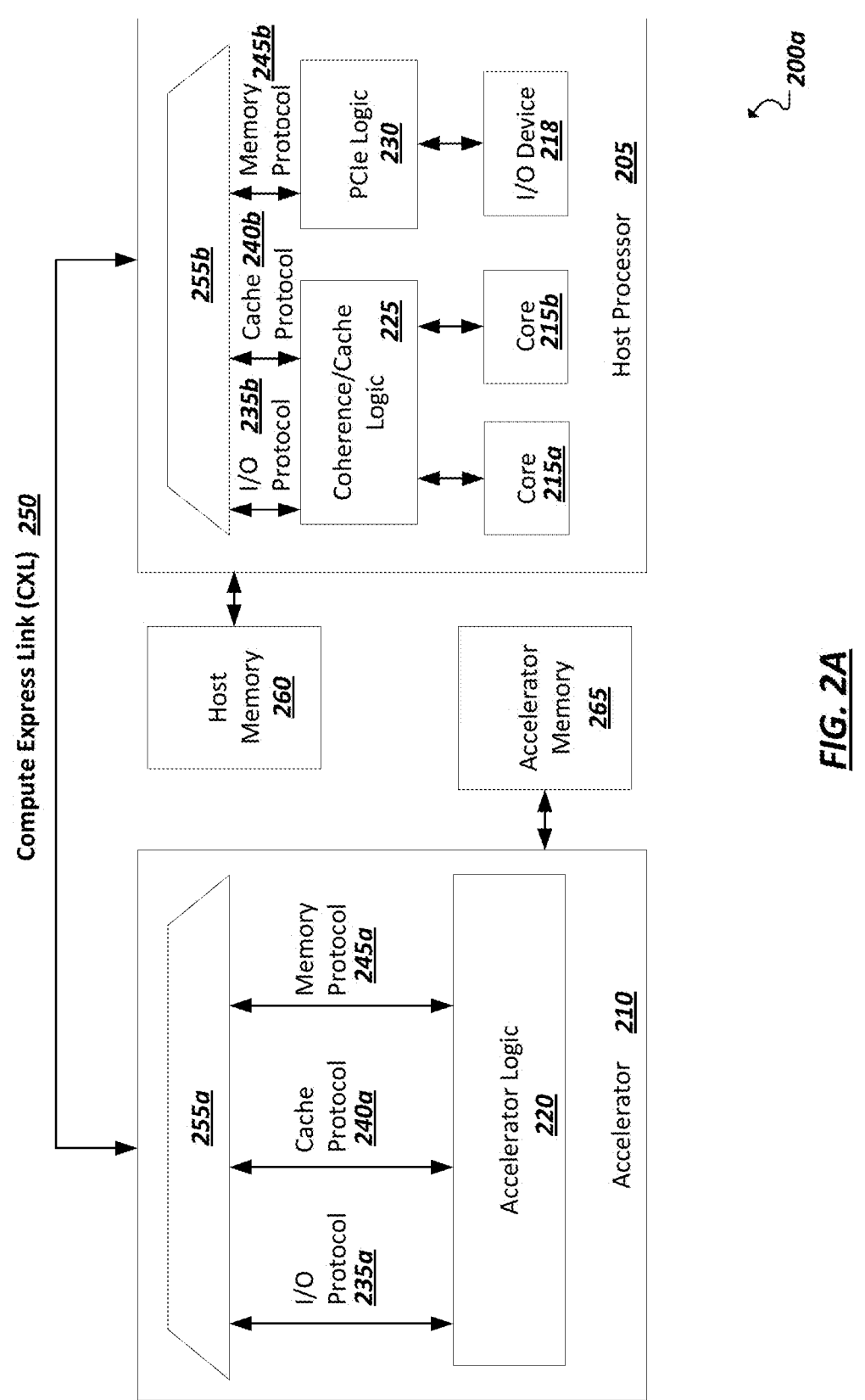
FIG. 2A illustrates a simplified block diagram of an example computing system utilizing a link compliant with a Compute Express Link (CXL)-based protocol.
Figure 2B:
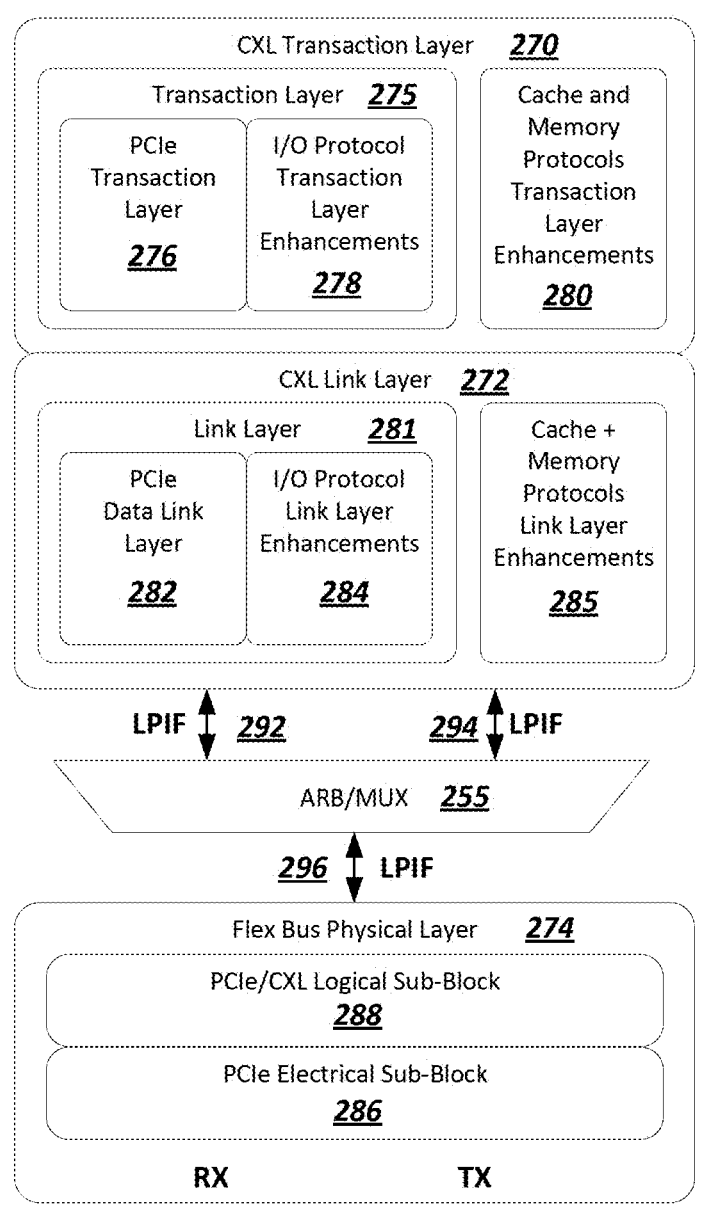
FIG. 2B illustrates a simplified block diagram of example protocol circuitry.

FIGS. 2A-2B are simplified block diagrams illustrating example protocol logic, implemented in hardware and/or software, to implement a Compute Express Link (CXL) protocol. It should be appreciated, that while much of the discussion centers on features provided by a CXL-protocol and communication channels compliant with CXL, that other substitute protocols with similar, comparable features may be substituted for CXL in the embodiments discussed below. The CXL interconnect protocol is designed to provide an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, networking accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of sub-protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Turning to FIG. 2A, a simplified block diagram 200a is shown illustrating an example system utilizing a CXL link 250. For instance, the link 250 may interconnect a host processor 205 (e.g., CPU) to an accelerator device 210. In this example, the host processor 205 includes one or more processor cores (e.g., 215a-b) and one or more I/O devices (e.g., 218). Host memory (e.g., 260) may be provided with the host processor (e.g., on the same package or die). The accelerator device 210 may include accelerator logic 220 and, in some implementations, may include its own memory (e.g., accelerator memory 265). In this example, the host processor 205 may include circuitry to implement coherence/cache logic 225 and interconnect logic (e.g., PCIe logic 230). CXL multiplexing logic (e.g., 255a-b) may also be provided to enable multiplexing of CXL protocols (e.g., I/O protocol 235a-b (e.g., CXL.io), caching protocol 240a-b (e.g., CXL.cache), and memory access protocol 245a-b (CXL.mem)), thereby enabling data of any one of the supported protocols (e.g., 235a-b, 240a-b, 245a-b) to be sent, in a multiplexed manner, over the link 250 between host processor 705 and accelerator device 210.

In some implementations, a Flex Bus port may be utilized in concert with CXL-compliant links to flexibly adapt a device to interconnect with a wide variety of other devices (e.g., other processor devices, accelerators, switches, memory devices (e.g., near memory, far memory, pooled memory, tiered memory, cache, etc.), among other examples). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

FIG. 2B is a simplified block diagram 200b illustrating an example protocol stack and associated logic (implemented in hardware and/or software) utilized to implement CXL links. For instance, the protocol logic may be organized as multiple layers to implement the multiple protocols supported by the port. For instance, a port may include transaction layer logic (e.g., 270), link layer logic (e.g., 272), and physical layer logic (e.g., 274) (e.g., implemented all or in-part in circuitry). For instance, a transaction (or protocol) layer (e.g., 270) may be subdivided into transaction layer logic 275 that implements a PCIe transaction layer 276 and CXL transaction layer enhancements 278 (for CXL.io) of a base PCIe transaction layer 276, and logic 280 to implement cache (e.g., CXL.cache) and memory (e.g., CXL.mem) protocols for a CXL link. Similarly, link layer logic 272 may be provided to implement a base PCIe data link layer 282 and a CXL link layer (for CXl.io) representing an enhanced version of the PCIe data link layer 284. A CXL link layer 272 may also include cache and memory link layer enhancement logic 285 (e.g., for CXL.cache and CXL.mem).

Continuing with the example of FIG. 2B, a CXL link layer logic 272 may interface with CXL arbitration/multiplexing (ARB/MUX) logic 255, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 274 based on a PCIe physical layer (e.g., PCIe electrical PHY 286). For instance, a Flex Bus physical layer may be implemented as a converged logical physical layer 288 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., x16, x8, x4, x2, x1, etc.). In PCIe mode, links implemented by the port may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 272) to circuitry or other logic (e.g., an IP block or other hardware element) implementing at least a portion of a physical layer (e.g., 274) of a protocol. For instance, an interface based on a Logical PHY Interface (LPIF) specification to define a common interface between a link layer controller, module, or other logic and a module implementing a logical physical layer ("logical PHY" or "log PHY") to facilitate interoperability, design and validation re-use between one or more link layers and a physical layer for an interface to a physical interconnect, such as in the example of FIG. 2B. Additionally, as in the example of FIG. 2B, an interface may be implemented with logic (e.g., 281, 285) to simultaneously implement and support multiple protocols. Further, in such implementations, an arbitration and multiplexer layer (e.g., 255) may be provided between the link layer (e.g., 272) and the physical layer (e.g., 274). In some implementations, each block (e.g., 255, 274, 281, 285) in the multiple protocol implementation may interface with the other block via an independent interface (e.g., 292, 294, 296). In cases where bifurcation is supported, each bifurcated port may likewise have its own independent interface, among other examples.

CXL is a dynamic multi-protocol technology designed to support accelerators and memory devices. CXL provides a rich set of protocols. CXL.io is for discovery and enumeration, error reporting, peer-to-peer (P2P) accesses to CXL memory and host physical address (HPA) lookup. CXL.cache and CXL.mem protocols may be implemented by various accelerator or memory device usage models. An important benefit of CXL is that it provides a low-latency, high-bandwidth path for an accelerator to access the system and for the system to access the memory attached to the CXL device. The CXL 2.0 specification enabled additional usage models, including managed hot-plug, security enhancements, persistent memory support, memory error reporting, and telemetry. The CXL 2.0 specification also enables single-level switching support for fan-out as well as the ability to pool devices across multiple virtual hierarchies, including multi-domain support of memory devices. The CXL 2.0 specification also enables these resources (memory or accelerators) to be off-lined from one domain and on-lined into another domain, thereby allowing the resources to be time-multiplexed across different virtual hierarchies, depending on their resource demand. Additionally, the CXL 3.0 specification doubled the bandwidth while enabling still further usage models beyond those introduced in CXL 2.0. For instance, the CXL 3.0 specification provides for PAM-4 signaling, leveraging the PCIe Base Specification PHY along with its CRC and FEC, to double the bandwidth, with provision for an optional flit arrangement for low latency. Multi-level switching is enabled with the CXL 3.0 specification, supporting up to 4K Ports, to enable CXL to evolve as a fabric extending, including non-tree topologies, to the Rack and Pod level. The CXL 3.0 specification enables devices to perform direct peer-to-peer accesses to host-managed device memory (HDM) using Unordered I/O (UIO) (in addition to memory-mapped I/O (MMIO)) to deliver performance at scale. Snoop Filter support can be implemented in Type 2 and Type 3 devices to enable direct peer-to-peer accesses using the back-invalidate channels introduced in CXL.mem. Shared memory support across multiple virtual hierarchies is provided for collaborative processing across multiple virtual hierarchies, among other example features.

Figures 3A, 3B, 3C:
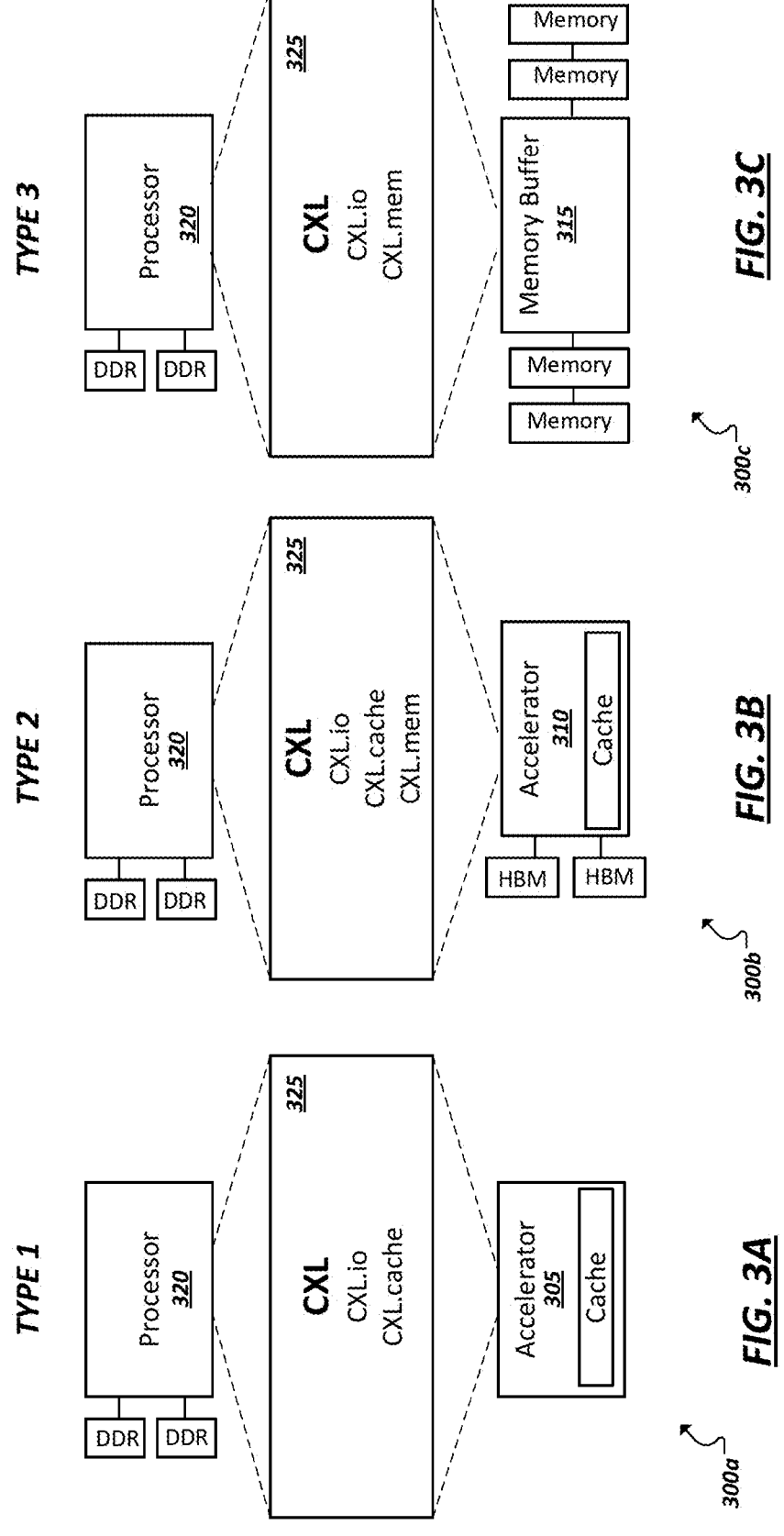
FIGS. 3A-3C are simplified block diagrams illustrating example device types within a Compute Express Link (CXL) infrastructure.

CXL is a high-performance I/O bus architecture that is used to interconnect peripheral devices that can be either traditional non-coherent I/O devices, memory devices, or accelerators with additional capabilities. When Type 2 and Type 3 device memory is exposed to the host, it is referred to as Host-managed Device Memory (HDM). The coherence management of this memory may be Host-only Coherent (HDM-H), Device Coherent (HDM-D), and Device Coherent using Back-Invalidation Snoop (HDM-DB). The host and device must have a common understanding of the type of HDM for each address region. FIGS. 3A-3C are simplified block diagrams 300a-c showing examples of CXL Type 1 devices (e.g., 305), Type 2 devices (e.g., 310), and Type 3 devices (e.g., 315). A CXL device (e.g., 305, 310, 315) may couple to a host processor (e.g., 320) via a CXL interconnect 325. Different CXL device types may utilize different combinations of the CXL protocols (or sub-protocols) (e.g., CXL.io, CXL.mem, CXL.cache).

In CXL, a "Type 1" devices have special needs for which having a fully coherent cache in the device becomes valuable. For such devices, standard producer-consumer ordering models do not work well. One example of a device with special requirements is to perform complex atomics that are not part of the standard suite of atomic operations present on PCIe. Basic cache coherency allows an accelerator to implement any ordering model it chooses and allows it to implement an unlimited number of atomic operations. These tend to require only a small capacity cache which can easily be tracked by standard processor snoop filter mechanisms. The size of cache that can be supported for such devices depends on the host's snoop filtering capacity. CXL supports such devices using its optional CXL.cache link over which an accelerator can use CXL.cache protocol for cache coherency transactions.

CXL "Type 2" devices, in addition to fully coherent cache, also have memory, for example DDR, High-Bandwidth Memory (HBM), or other memory attached to the device. These devices execute against memory, but their performance comes from having massive bandwidth between the accelerator and device-attached memory. One goal for CXL is to provide a means for the Host to push operands into device-attached memory and for the Host to pull results out of device-attached memory such that it does not add software and hardware cost that offsets the benefit of the accelerator. Systems may include coherent system address-mapped device-attached memory, also referred to as HDM with Device Managed Coherence (HDM-D/HDM-DB). There is an important distinction between HDM and traditional I/O and PCIe Private Device Memory (PDM). An example of such a device is a GPGPU with attached GDDR. Such devices have treated device-attached memory as private. This means that the memory is not accessible to the Host and is not coherent with the remainder of the system. It is managed entirely by the device hardware and driver and is used primarily as intermediate storage for the device with large data sets. A disadvantage to a model such as this is that it involves high-bandwidth copies back and forth from the Host memory to device-attached memory as operands are brought in and results are written back. Please note that CXL does not preclude devices with PDM.

At a high level, there are two example approaches of resolving device coherence of HDM. The first uses CXL-.cache to manage coherence of the HDM and is referred to as "Device coherent." The memory region supporting this flow is indicated with the suffix of "D" (HDM-D). The second approach uses the dedicated channel in CXL.mem called Back Invalidation Snoop and is indicated with the suffix "DB" (HDM-DB). With HDM-DB, the protocol enables new channels in the CXL.mem protocol that allow direct snooping by the device to the host using a dedicated Back-Invalidation Snoop (BISnp) channel. The response channel for these snoops is the Back-Invalidation Response (BIRsp) channel. The channels allow devices the flexibility to manage coherence by using an inclusive snoop filter tracking coherence for individual cache lines that may block new M2S Requests until BISnp messages are processed by the host.

A CXL "Type 3" device supports CXL.io and CXL.mem protocols. An example of a CXL Type 3 Device is a memory expander for the Host. Since this is not a traditional accelerator that operates on host memory, the device does not make any requests over CXL.cache. A passive memory expansion device would use the HDM-H memory region and while not directly manipulating its memory while the memory is exposed to the host. The device operates primarily over CXL.mem to service requests sent from the Host. The CXL.io protocol is used for device discovery, enumeration, error reporting and management. The CXL.io protocol is permitted to be used by the device for other I/O-specific application usages. The CXL architecture is independent of memory technology and allows for a range of memory organization possibilities depending on support implemented in the Host. Type 3 device Memory that is exposed as an HDM-DB enables the device to directly manage coherence with the host to enable in-memory computing and direct access using UIO on CXL.io. A Type 3 Multi-Logical Device (MLD) can partition its resources into up to multiple (e.g., 16) isolated Logical Devices. Each Logical Device may be identified by a Logical Device Identifier (LD-ID) in CXL.io and CXL.mem protocols. Each Logical Device visible to a Virtual Hierarchy (VH) operates as a Type 3 device. The LD-ID is transparent to software. MLD components have common Transaction and Link Layers for each protocol across all LDs.

CXL is capable of maintaining memory coherency between the CPU memory space and memory on attached devices, so that any of the CPU cores or any of the other I/O devices configured to support CXL may utilize these attached memories and cache data locally on the same. Further, CXL allows resource sharing for higher performance, such that memory pooling may be achieved across different computing entities. Such CXL-enabled memory pools may enable enhanced and more efficient movement of operands. For instance, rather than utilizing DMA operation to transfer an entire segment of data from one computing element to the next computing element in association with a corresponding operation, coherent memory allows data to be moved seamlessly as if it were a simple transfer between the different cores in different CPU sockets. Such memory pooling can thus realize significant latency reduction and enable this aggregated memory in the system. Such features can enable more efficient memory usage, reduced architectural complexity, and thereby lower overall system costs. Further, such features allows programmers and system developers to focus on target workloads as opposed to redundant memory management, among other example benefits.

Figure 4:
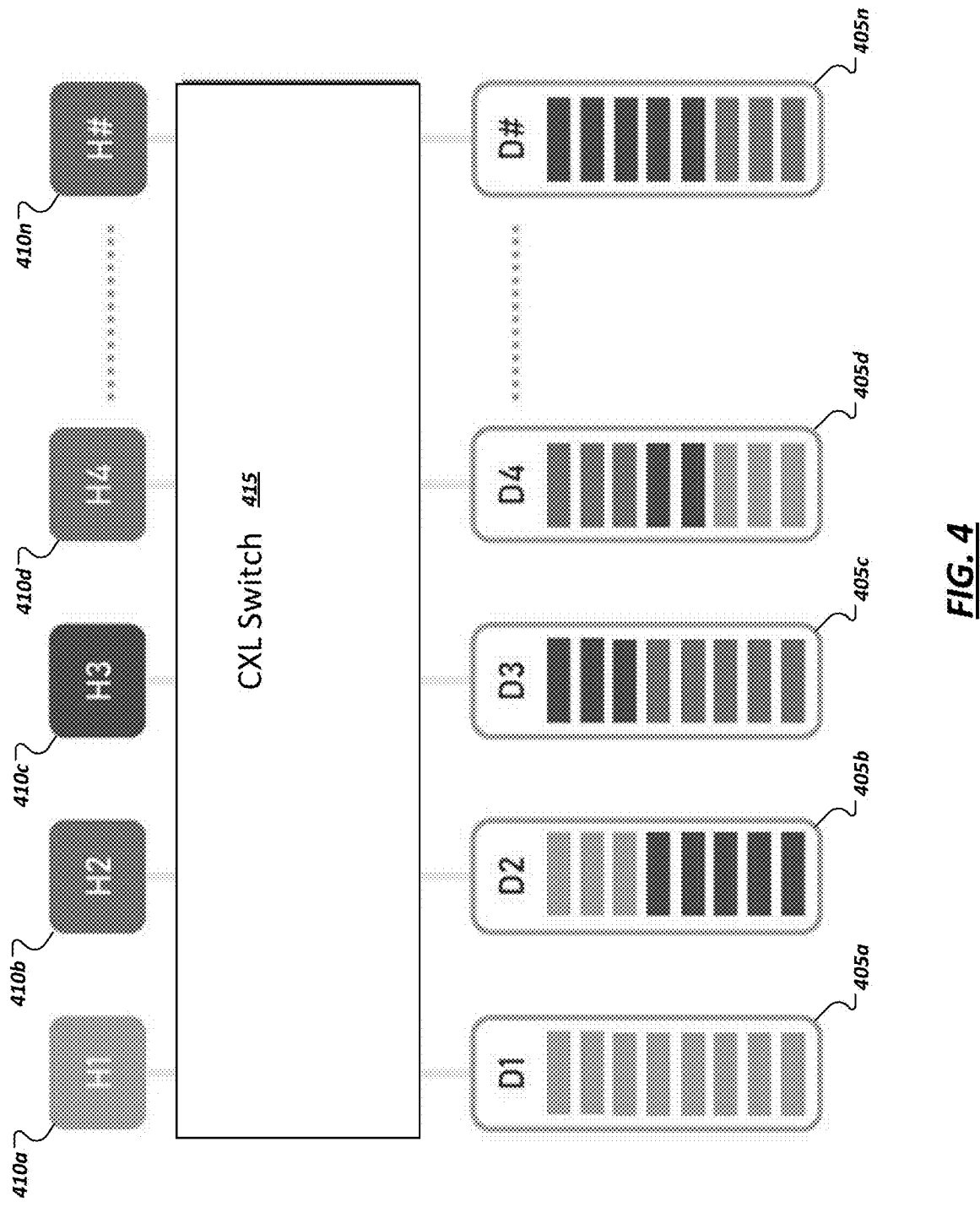
FIG. 4 is a simplified block diagram illustrating memory pooling using a CXL protocol.

FIG. 4 is a simplified block diagram 400 illustrating the example pooling of multiple devices 405a-n (e.g., logical type 2 devices) to multiple host devices 410a-m. CXL (e.g., CXL 2.0) enables such pooling utilizing a CXL switch 415 (with a standardized CXL Fabric manager 418), where the memory on the devices 405a-n can be assigned to or shared with different hosts (e.g., 410a-m) and can be changed over time. The CXL switch 415 supports multiple hosts and is responsible for ensuring quality of service as well as isolation between different hosts. Other implementations, may utilize processing-in-memory (PIM) within their systems or cluster, including logic-in-memory or near-data processing. PIM technology aims to bring memory and computing closer instead of separating them, thus, improving the efficiency of data movement. Traditional PIM systems, however, may struggle with data coherence issues, as both a host processor and PIM processing can handle and compete for data, among other example issues.

Figure 5:
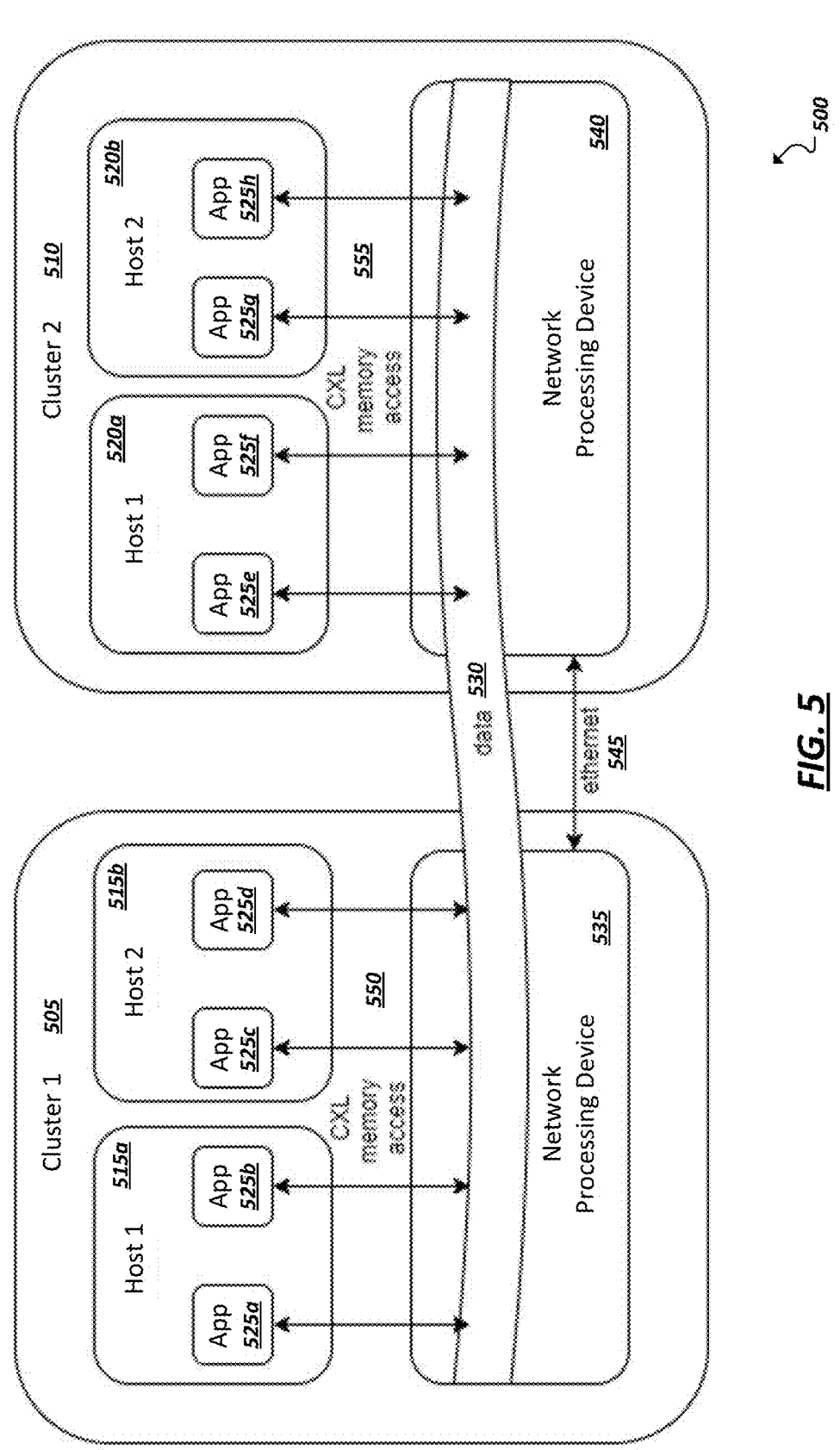
FIG. 5 is a simplified block diagram illustrating an example data center cluster architecture.

Improved node or cluster architectures may leverage the combined features of CXL and smart network processing devices (e.g., IPUs) to develop more efficient and better-performing service mesh clusters, which achieve these efficiencies with minimal movement of networking data and enhanced near memory processing. Such improved clusters can realize smaller latency, better resources utilization, and lower power consumption, among other example benefits. FIG. 5 is a simplified block diagram 500 illustrating a logical view of such a portion of such an improved cluster. As introduced above, a service mesh can be composed of one or multiple clusters (e.g., 505, 510). Host devices (e.g., 515a, 515b, 520a, 520b, etc.) may each host various programs, services, or applications (e.g., 525a-h), which are executed on the corresponding host and which may share and operate various data on the service mesh. All of the data 530 moving within the cluster may be handled using the corresponding cluster's network processing device (e.g., 535, 540), with the network processing device further handling the inter-cluster communications and the internal connections of hosts and the network processing device within the cluster. Attached memory of the network processing device may be utilized to implement a memory pool for the cluster. Accordingly, data used in transactions within the cluster may be saved in the memory pool on the network processing device. Accordingly, when host device accesses the data within a transaction, the host device can utilize CXL memory accesses (e.g., 550, 555) to directly read or write data through the CXL cached memory as if it were local memory.

Figure 6:
FIG. 6 is a simplified block diagram illustrating data transfers within an example data center cluster architecture.

Turning to FIG. 6, a simplified block diagram 600 illustrating example hardware blocks of components within a cluster, such as the example shown in FIG. 5. For instance, each host device (e.g., 515a-n) may include respective local or attached memory (e.g., 605a-c) as well respective processing hardware 610a-c (e.g., CPU, FPGA, GPU, tensor processing unit (TPU), accelerator hardware, etc.), which may be utilized to host and execute various applications or portions of applications on the corresponding host. Each of the host devices 515a-c may be connected to a CXL switch 525 for the cluster. The network processing device 535 of the cluster is also coupled to the switch 525. The network processing device 535 may include both a CPU 615 and programmable processing block 620 (e.g., a field programmable gate array (FPGA) or application-specific integrated circuit (ASIC)), together with attached memory 625, at least a portion of which is designated for use as a memory pool for the cluster.

In one example implementation, the network processing device 535 may be installed as a CXL type 2 device. Accordingly, the CPUs (e.g., 610a-c) of the hosts 515a-c, as well as the CPU (e.g., 615) of the network processing device 535, can cache (e.g., perform cacheable reads and cacheable writes of) the attached memory of the network processing device 535 using the CXL.mem subprotocol. The programmable processing block 620 of the network processing device 535 may cache the hosts' attached memory (e.g., 605a-c) using the CXL.cache subprotocol. Further, a dedicated hardware channel may be provided between the CPU 615 and programmable processing block 620 of the network processing device 535, allowing the CPU 615 to access the hosts' memories (e.g., 605a-c) through the programmable processing block 620 (e.g., also using the CXL.cache subprotocol), among other example features and implementations.

Data centers and data center networks continue to grow in prevalence and performance capabilities as cloud computing and other distributed computing architectures and systems grow in prevalence. With data center network speeds reaching 100 Gps and continuing to increase, conventional communication protocols may not be able to keep pace. For instance, the transmission control protocol (TCP) cannot provide the performance that cloud service providers need or desire to provide their respective services (e.g., infrastructure as a service (IaaS), software as a service (SaaS), platform as a service (PaaS), etc.). For instance, TCP is not generally suited for latency sensitive processing due to its congestion management and retransmission control features.

Further, data movement between memory, processors, and I/O devices struggle to meet the demands of memory intensive applications using traditional protocols.

Workloads handled by distributed computing architectures also continue to evolve. New workloads and applications challenge traditional data center assumptions and architectures. For instance, modern workloads may correspond to a set of microservices with various memory and bandwidth needs, with modern data centers struggling to accommodate dynamic changes in system configurations optimal for these various workloads and/or inefficiencies in reconfiguring system resources quickly between what can be short-lived microservice workloads. As additional examples, evolving machine learning and tensor processing workloads may require vastly different workloads from other more traditional applications. Data center designers traditional face a choice: how to outfit a datacenter that is future proof and that can handle a wide range of application, or alternatively capabilities specialized for only select workload types.

In an improved system implementation, a data center cluster may be implemented utilizing the CXL-based communication channels. For instance, a CXL-based data center cluster may include a number of host computers coupled to a CXL-based switch. Traffic within the cluster and between clusters may be implemented utilizing a network processor device (e.g., a smart network interface controller (NIC), data processing unit (DPU), infrastructure processing unit (IPU), programmable networking device, etc.), which is connected to or even incorporates the CXL-based switch. Local memory of the network processor device may be utilized to construct a shared memory pool for the cluster, which can be leveraged to facilitate efficient data transfers utilizing CXL. CXL enables a more efficient data transmission than TCP and RDMA between all the processors and accelerators of the cluster. The network processor device may be configured with logic (implemented in hardware, firmware, and/or software) to perform near-data processing for the cluster and reduce the memory movement, to thereby provide more efficient performance in an improved service mesh cluster architecture. Such an architecture can be used to implement data center clusters with reduced memory movement between hosts, lower latency, improved resource utilization, and lower power consumption, among other example benefits.

Indeed, features of CXL and clusters and networks implemented using CXL offer a number of enhancements in how servers within a datacenter can communicate. Technologies like RDMA, that facilitate direct access of a remote node's memory, introduced the concept of availing direct access to a remote node's memory resources. Now, with CXL, this pushes the limits further by enabling modular system building to effectively plug-and-play various computing resources (e.g., caching devices/accelerators, accelerators with memory, and memory buffers) from a remote node to a given node. To accomplish such a system, however, considerations such as performance impacts, coherence requirements, quality of service, and other factors are to be considered and the system components configured accordingly. Modern system hardware lacks the logic to facilitate such system building.

Figure 7A:
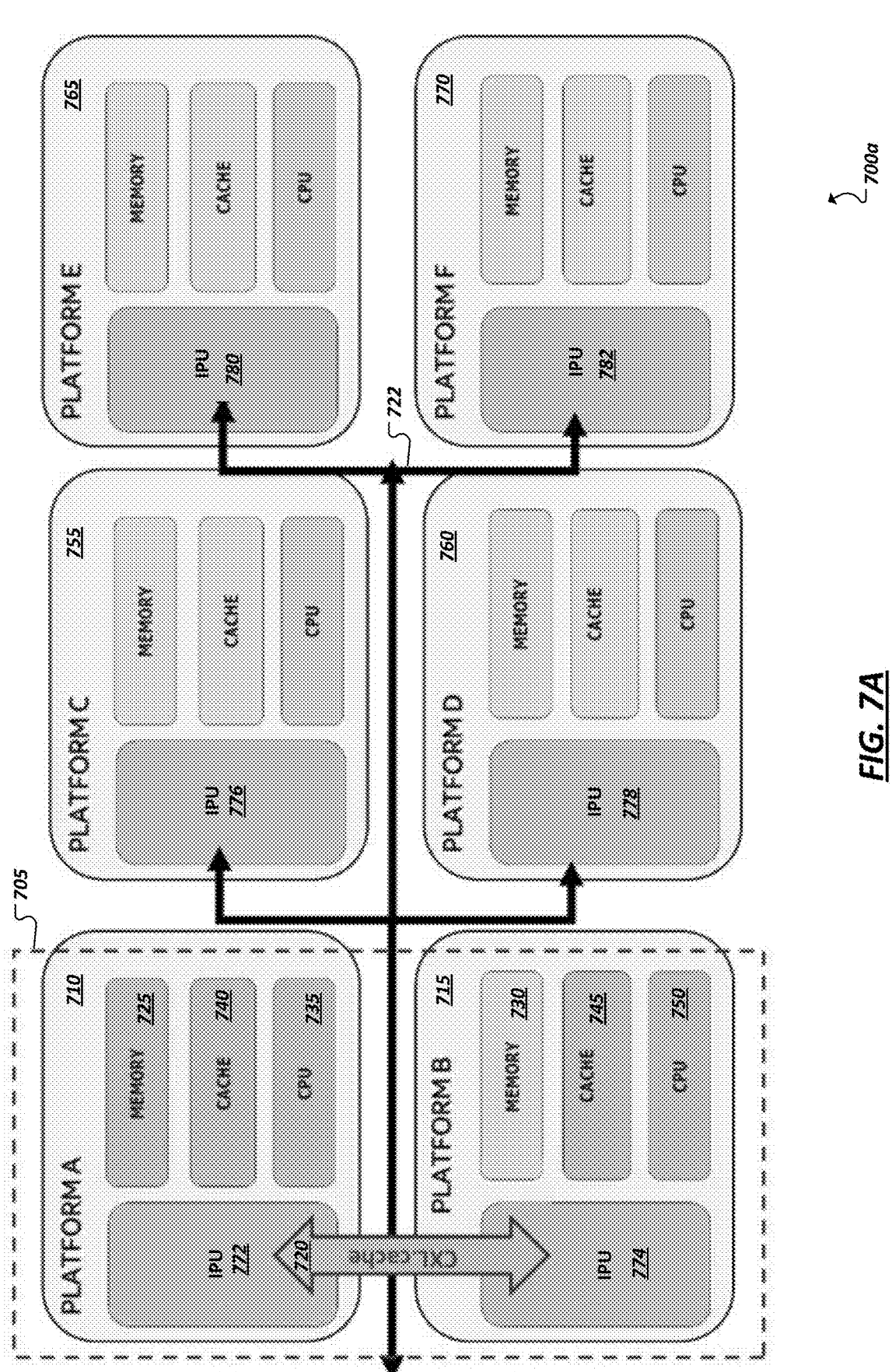
FIGS. 7A-7B are simplified block diagrams illustrating example CXL network configurations.

Even with the flexible system options enabled through CXL, configuring a CXL "network" nonetheless involves configuration of the CXL link(s) to be used for the network. For instance, the simplified block diagram 700a illustrated in FIG. 7A, shows the establishment of an example CXL network 705 interconnecting two platforms or nodes or clusters (e.g., 710, 715). For instance, setting up a two-node CXL network 705 may involve selection of the CXL protocol (e.g., CXL.io, CXL.mem, or CXL.cache) to be used in communications between devices in the networks, the particular set of devices (e.g., selected from the platforms 710, 715) to be added, as well as considerations such as performance impacts, coherence requirements, quality of service, and other factors. Based on these selections, the system components are configured accordingly to implement the desired characteristics. However, modern system hardware lacks the logic to facilitate such system building.

Continuing with the example of two nodes 710, 715 communicating in an example CXL network 705, in one implementation, the nodes may be configured to communicate over a CXL.cache protocol 720 to allow each node to access the local memory (e.g., 725, 730) of the other node as remote memory. Such an implementation, however, may introduce heavy overhead. For instance, if Platform B 715 is to access Platform A's memory 725 as a "local resource", with CXL.cache, the CPU 735 in platform A would be snooped for copies of data in its caches. As a consequence, in such an example transaction each of components 725, 735, 740, 745, 750, etc. would be involved in CXL.cache communications (e.g., request, response, snoop, snoop response, etc.) to complete a single remote memory cache. In some examples, such an access may be tied to software execution on Platform B 715. Once the corresponding application, service, or microservice completes execution, the next workload that is to use these resources may involve changing the configuration used in this example two node network (e.g., revert from CXL.cache to CXL.mem protocol), among other examples.

Data centers utilizing CXL may encounter new functional requirements as workloads realize the promised dynamicity introduced through short-lived software services in emerging cloud native paradigms. For instance, given dynamicity with data center usages, particularly in domains like cloud native usages, where functions and microservices may be very short lived, protocol may be switched after a microservice using the resources executes to completion. For instance, in the example of FIG. 7A, while a CXL.cache (also referred to as CXL.cachemem) space may have been used for a microservice running on platforms A and B, but after completion, CXL.cache may no longer be required and a CXL.mem space may be used instead.

As another example, based on the specific software resources utilizing system resources, CXL networks may be resized with more or fewer component nodes. Advantageously, such network resizing may be performed on the fly, and such dynamic resizing may be applied concurrently for several such networks that in turn may also grow and shrink dynamically. Such network building may also involve resource access controls and other actions, features that, when coupled with dynamicity in domain growth, would overwhelm traditional systems at scale, among other example issues.

Figure 7B:
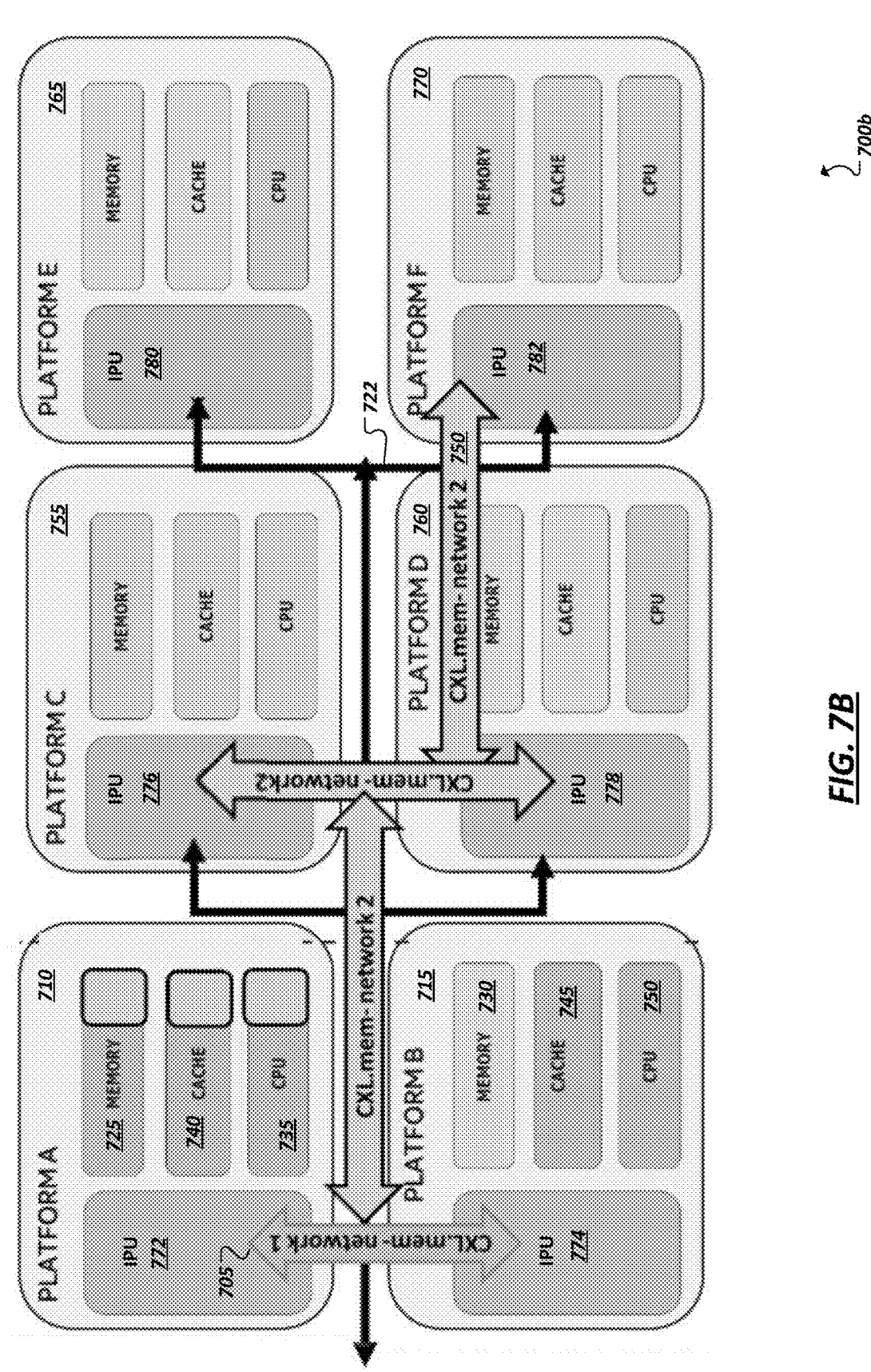

FIG. 7B shows the system illustrated in FIG. 7A. The system may include multiple nodes (e.g., 710, 715, 755, 760, 765, 770), each with a respective network processing device (e.g., IPUs 772, 774, 776, 778, 780, 782). The network processing devices may be interconnected by a fabric of interconnects (e.g., 722) and thereby enable logic resident on the network processing devices to form various networks connecting various combinations of devices within the various nodes using the respective network processing devices (e.g., 772, 774, 776, 778, 780, 782) of the nodes (e.g., 710, 715, 755, 760, 765, 770). For instance, as shown in the example of FIG. 7B, multiple networks (e.g., 705, 750) may be formed using the resources of the interconnected nodes. In some cases, the same devices and resources may be included in more than one of the networks formed within the system. Such networks may be facilitated through appropriate access controls and permission handling, in addition to protocol switching. Further, each network constructed using the nodes may grow and shrink dynamically and replace resources with other resources in the system, among other example features.

Another consideration in the dynamic generation of CXL networks is the dependence on access pattern and data sharing. In some cases, it might make sense to use CXL-.cache if the amount of data sharing is minimal in span. The benefits of coherence could serve to justify an increase in the number of cores collaboratively working on a problem. In other cases, this might not make sense. Run-time telemetry information may also be considered to determine which protocol(s) to use, how to route data, and how to size the network. As an example, if the CXL network is being expanded from 2 nodes to 4 nodes, the expansion of the network may also trigger a change in protocol, for instance, if the increased number of nodes will result in coherence overheads that would jeopardize the ability of the resources to keep up or satisfy a quality of service (QoS) for the workload, among other example considerations.

In some implementations, network processing devices may be enhanced with additional logic to implement dynamic CXL protocol changes between CXL networks formed using network processing devices. Enhanced network processing devices may also be provided with functionality to dynamically resize and reconfigure multiple CXL networks and network data flows on the fly, among other example features. Using such network processing devices, CXL networks can be formed in a modular manner utilizing the various resources (e.g., compute and memory resources) of CXL-enabled devices (e.g., hosts, accelerators, memory expanders, etc.) to dynamically compose, expand, arbitrate, and decompose various CXL networks using the same data center nodes.

In some examples, a system management entity may be provided for use with the system, such as logic residing in an operating system or hypervisor, for performing management tasks involving various platforms within the system. In some cases, the system management entity may be implemented as an orchestrator (e.g., Kubernetes™) or system management logic included on the network processing device or another network processing device in the network, among other examples. Accordingly, in some implementations, an enhanced network processing device, such as an enhanced IPU, at boot time or in response to devices being added to the platform (e.g., connected to the IPU directly or via a switch), can cooperate with a system management entity in order to register the new device(s) and obtain information regarding the new devices and whether (and under what conditions) resources of the new device can be shared with other elements in the system (e.g., at the local data center or other locations). For instance, system management or orchestrator logic (which is central or distributed among entities in the system) may request to devote a portion of the new device (or other devices connected in the system) for access and use by other peers of the infrastructure (which may be identified with particular IDs or subnets, etc.).

In one example, the network processing device may broadcast to other devices or network processing devices that sharable resources are available for use by all or a select portion of other devices in the system. The broadcasted information may include information such as the type of resource being shared, potential capacity or amount of the resource that may be used, and how the resource can be accessed (e.g., by which protocol (e.g., CXL.mem, CXL-.cache, etc.). Accordingly, a network processing device may identify or discover the individual devices coupled to it in its cluster, as well as the attributes of these devices and their respective resources and capabilities. The network processing device may then present the discovered resources, as well as the sharable portion of those resources to the outside world, including software, system management entities and orchestrators, as well as other network processing devices. As one example, network processing devices that include smart endpoint (SEP) logic (e.g., an SEP IP block) may develop and present connected devices as an abstraction (or meta-) device. In some instances, an SEP block may be implemented as programmable IP that allows a network processing device (e.g., an IPU, smartNIC, or other device) to present any device to the host system, with the network processing device using the SEP to itself emulate the connected device's front-end using the networking protocol engines as the back-end functionality. In some instance, the SEP logic of the network processing device may be used to aggregate several connected devices (e.g., CXL.mem devices) and present those as a single device to the host. The agent running on the compute complex (ACC) would provide an interface to configure and manage the resulting meta-device. The SEP logic would be responsible for routing and load-balancing traffic to underlying CXL.mem devices, possibly based on configuration rules and policies, such as policies related to security and performance constraints. For example, the policy could constrain building meta-device only based on secured (e.g., attested) platforms, or building meta-devices that can represent an aggregation of real devices whose combined memory size is bigger than a single memory device can provide (e.g., albeit additional latency requirements), among other examples.

Network processing devices may be utilized within a cluster to enable resource sharing between devices in the cluster. Additionally, network processing devices may be also utilized to communicate with peer network processing devices in a system or network to facilitate resource sharing between clusters or platforms. For instance, a network processing device may request access to a shareable resource on another platform (e.g., on behalf of a host on its platform) and identify the characteristics of the resource sharing. For instance, the request may indicate the amount of the resource to be accessed/utilized (e.g., the virtual function (VF)/virtual pointer (VP) associated with a GPU partition, size of memory to be used, etc.), performance hints (e.g., latency or bandwidth requested), functional hints (e.g., coherency request or threshold data consistency levels (e.g., consistency accepted at least X % of the time in lieu of full coherency), the amount of time to use the resource, the CXL protocols supported or requested for use, etc. In some implementations, requests may be subject to privilege levels or other policies and the sending and/or receiving network processing device may first validate that the request is in compliance with these policies before proceeding with the request. Additionally, after a request to share a resource is granted, the receiving network processing device can enforce the policies by validating that any specific CXL requests pertaining to the accessing of the resource are in compliance with the agreed upon policies (e.g., which may be negotiated as part of a handshake with the other network processing device, etc.).

As noted above, an enhanced network processing device may leverage CXL-based memory pooling capabilities to identify conditions, policies, and requested features of a resource sharing arrangement within the system and can even make dynamic adjustments to protocols, data flows, and the structure of the CXL network using the shared resources to facilitate related transaction and/or abide by negotiated network characteristics or rules. For instance, an IPU processing requests from another IPU can dynamically change between different protocols. For instance, if access via CXL.cache is affecting performance for a particular device (e.g., in violation of a desired or agreed upon performance metric) the corresponding network processing device may change the protocol temporarily into CXL.mem, among other example implementations. In some implementations, additional system resources may be provided together with enhanced network processing devices to facilitate the dynamic adjustments and configurations of example CXL networks, such as system management entities, baseboard management controllers (BMC), among other examples. For instance, as part of the potential resource sharing, CXL-compliant BMC (CXL.BMC) resource can be used to implement governance models around sharing and managing resources over the new proposed scheme (e.g., to make a system configuration change, such as how memory is exposed, interleaved, or partitioned, etc.), among other examples.

Figure 8:
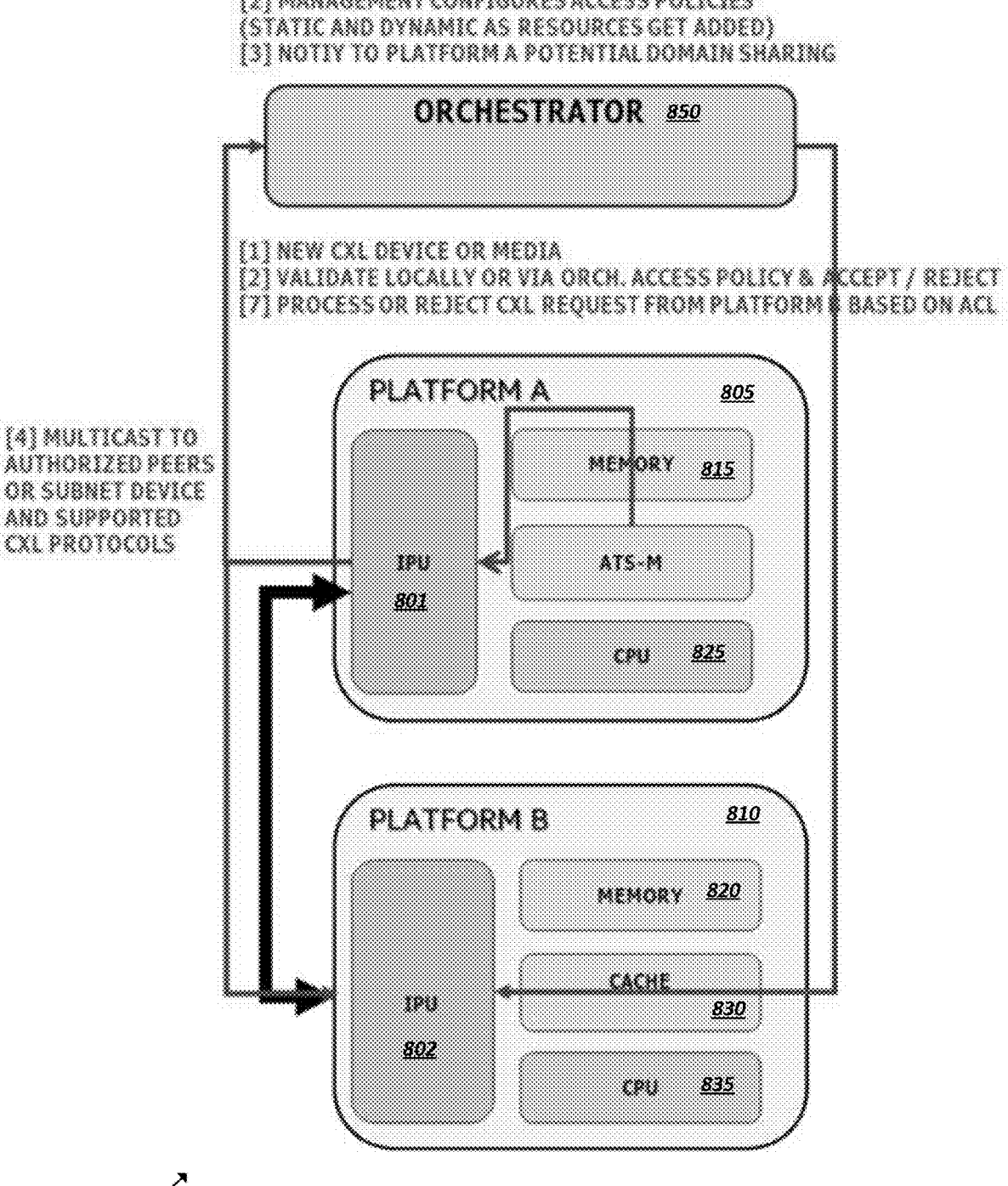
FIG. 8 is a simplified block diagram illustrating example operation of a network processing device with a system management entity.

FIG. 8 is a simplified block diagram 800 illustrating example interactions between two platforms 805, 810 facilitated through their respective network processing devices (e.g., IPUs 801, 802). Various resources (e.g., 815, 820, 825, 830, 835) may be included or attached to the devices coupled to the IPUs. These devices, for instance, may be CXL Type 1, 2, or 3 devices. A system management entity, such as orchestrator 850, may be provided. The orchestrator may include logic, implemented in hardware and/or software, which assists in determining whether and under what conditions or circumstances various resources may be shared. The orchestrator may assist in developing and enforcing rules and policies governing how to build and/or dynamically modify CXL networks constructed using these platforms 805, 810 in connection with various applications, services, and microservices that may be hosted and their corresponding workloads. The orchestrator 850, in some implementations, may be implemented as a standalone entity or platform within the system, while in other systems may be implemented by system manager entities, or may be implemented on one or distributed among multiple platforms (e.g., using one or more of the network processing units of the system).

In one example, a resource (e.g., memory 815) may be identified within platform 805 by IPU 705. The presence of this resource (and other resources of the platform) may be identified (e.g., at 830) to other platforms, as well as the orchestrator 850 using unicast and/or multicast messaging. The network processing device may determine characteristics of the resource, including which CXL protocols it support, its capacity, bandwidth constraints and other limitations, and may advertise the same to its peers. In some cases, the network processing device may also determine proposed rules or policies for the sharing of this resource by other peer platforms (e.g., 810). In some cases, the orchestrator 850 may validate these proposed policies and/or develop new or revised policies that will govern how the resource will be shared within the system. For instance, the policies may limit which platforms or devices or devices types within the platforms may access the resource. For instance, access policies may dictate that a device possess certain trust or security characteristics, have functionality or certain technical capabilities (e.g., to operate compatibly with the device), or have other characteristics in order to be granted access to a given shareable resource based on the characteristics of this resource, among other examples.

With access policies determined, for instance, by the orchestrator based on information conveyed about a resource by the IPU 801, the orchestrator can advertise (e.g., at 835) the availability and conditions for accessing the resource to other IPUs (e.g., 802) in the system. In some implementations, an access control list (ACL) corresponding to the resource (e.g., managed by the network processing device of the platform) may be updated based on the policy negotiated or determined using the orchestrator. Accordingly, the network processing device (e.g., 801) of the platform (e.g., 805) hosting the resource (e.g., 815) may enforce the determined policy by consulting the ACL when requests to access the resource are received, granting or denying access in accordance with the determined policy. As noted above, the granting of access to the shared resource can be in connection with the dynamic growing or shrinking of a CXL network in the system. The policies may also be consulted in connection with attempts to dynamically change the protocols or data flows used with an CXL network, when such changes may impact a corresponding shared resource, among other examples.

Figure 9:
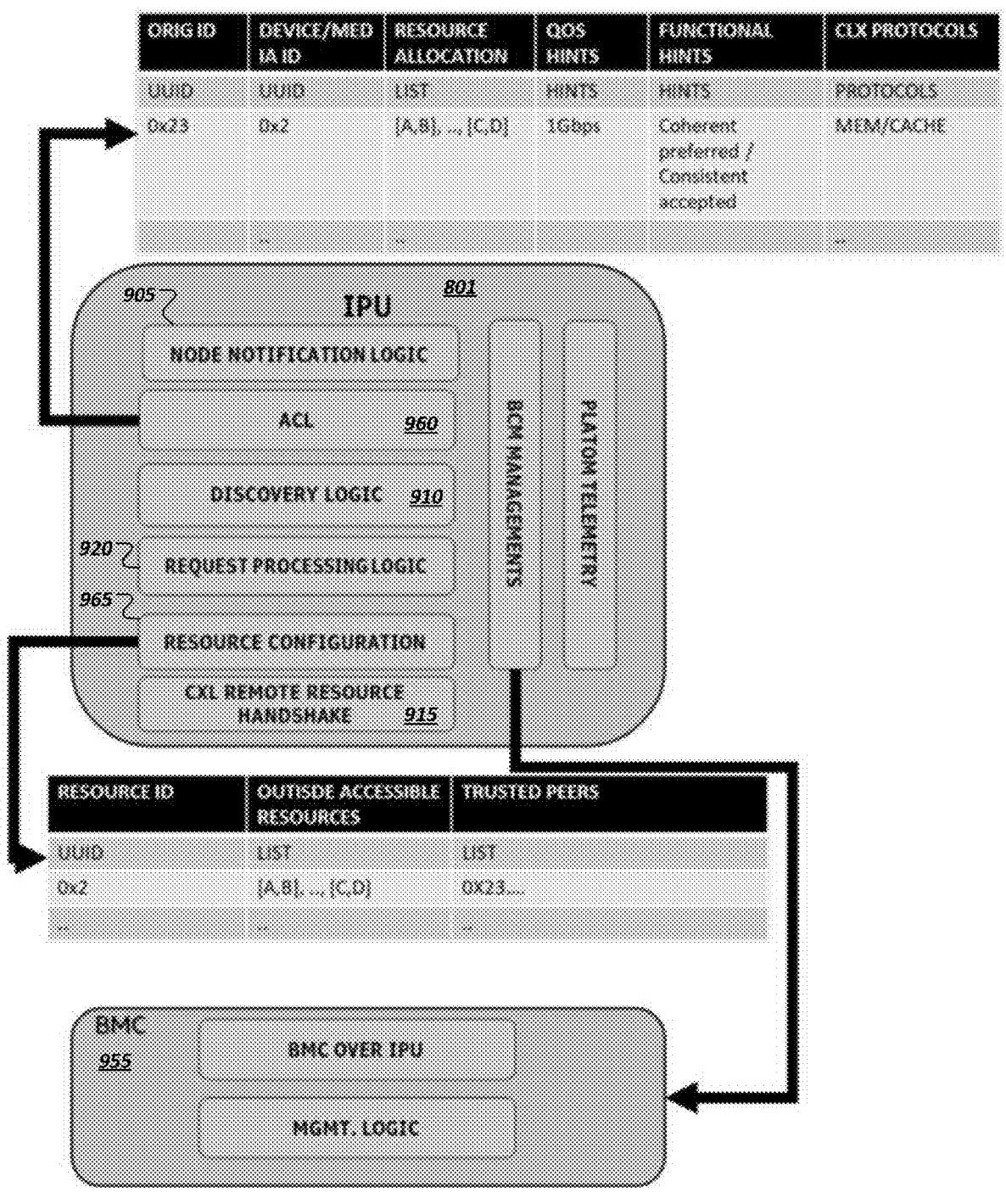
FIG. 9 is a simplified block diagram illustrating an example network processing device.

Turning to FIG. 9, a simplified block diagram 900 is shown illustrating an example implantation of an enhanced network processing device 801 equipped with logic to assist in implementing dynamic network construction, resizing, and reconfiguration, such as introduced above, by enabling finer grained resource sharing over fabric using CXL. For instance, node notification logic 905, discovery logic 910, and remote resource handshake logic 915 may be added as hardware circuitry, firmware, or software logic to a network processing device 801.

In one example, discovery logic 910 may function to work with the system infrastructure (e.g., system orchestrator entities, system manager entities, other network processing devices, etc.) on what devices (and their corresponding resource or part) can be shared with other devices in the network and in what manner. For instance, the network processing device 801 may, at boot time or in response to the addition of device into its platform, node, or cluster, work with a system management entity provided for the system (e.g., Kubernetes™) in order to register the new devices and their associated resources in the system. The network processing device may additional receive guidance on how those new resources can be shared with other elements of the infrastructure (e.g., at the local data center or other locations). For instance, a system management entity, based on the discovered features of a device's resources, may request to devote part of a device's resources (e.g., memory) for use by other peers of the system (which may be identified with particular IDs or subnet). As an example, when a device or media is added, the network processing device may reach out to the system management entity (e.g., configured via an model specific register (MSR)) and identify an identifier (e.g., universally unique ID (UUID)) for device and a description of the corresponding characteristics and capabilities of the device and its constituent resource. While, in some implementations, a system management or orchestration entity may be implemented as a single, centralized entity for the system, network, or sub-network, in other instances, system management may be decentralized and distributed among multiple physical machine and/or platforms (including network processing devices). For instance, a system management entity can be distributed and/or hierarchical, with some layers served by elements within network processing device (e.g., IPU) network itself (e.g., hosted by network processing devices), with other layers performed by Network Operating System (NOS) or distributed container/virtual machine (VM) framework(s) (e.g., VMware™, Kubernetes™, etc.), among other example implementations.

Continuing with the above example, a system management entity or orchestrator entity, upon receiving advertised device capabilities may determine if the advertised resources of the device may be shared with other devices in the network. Such a determination may be based, for instance, on whether excess capacity is predicted to be available for the resource, what security or trust requirements exist for the resource and whether other devices in the network possess the security, attestation, or trust levels required (e.g., under a policy) to access such resources, among other example considerations. The system management entity may also determine how much of a device's specific media or device can be shared with other devices and how it can be shared. For instance, if the device is memory, the system management entity may determine that up to 5% of the memory may be reserved for use by peers. However, if the device is a GPU that allows executions of functions it may not allocate a specific part of the device, but instead dictate how many requests per second will be accepted for use by peers, among other examples. The system management entity may further determine a conditional configuration of the region that will be shared. This includes rules and policies dictating which devices, applications, workloads, or device attributes may access the shared resource and what access types or levels may be granted based on the characteristics of these other device. In one example, an access rule or policy may identify devices capable of access a given shared resource (or class of shared resources), for instance, by adding the UUIDs of those allowed devices or identifying characteristics or classes of devices, which may more broadly access a shared resource and at what level (e.g., using which protocols, at what capacity or service level, etc.). A policy may also identify which CXL protocol is to be used to access the resource (e.g., CXL.mem or CXL.cache), and indicate any security measures that are to be used to enable the access (e.g., secret sharing, encryption, security tunnels, etc.).

Upon determining that a given resource may be shared and determining a policy for the sharing of this resource, the system management entity may generate a response message to the network processing device that notified the system management entity of the resource to identify to the network processing device (e.g., 801) the access policy for the resource. The access policy is to serve as the basis for network and resource virtualization and slicing. The network processing device (e.g., 801) receives and registers the access policy for the resource and utilizes this policy when receiving and handling subsequent requests associated with the resource from devices outside the platform seeking to share or access the resource.

After a policy has been defined and registered by the network processing device of the platform hosting the corresponding device and resource, the network processing device may notify other peer network processing devices of the availability of this resource. In some cases, the network processing device may broadcast advertisement of the resource, while in other cases unicast messages directed to and tailored to the access levels of individual network processing devices and their constituent devices may be sent, among other examples. The resource notification message of an available resource may include information including what type of resource is shared, potential capacity/amount to be shared, and how the resource can be accessed (e.g., CXL.mem/cache), etc. The interconnect coupling one network processing device to another within the system may vary, with various network processing devices using potentially different interconnect technologies (e.g., Ethernet, InfiniBand, optical, etc.) to implement control/management and data planes coupling these network processing devices, with CXL being utilized within the node, cluster, or platform itself. For instance, communication of a resource notification message can be implemented either as CXL encapsulation over that fabric (e.g., CXL-over-Ethernet), or using an integrated translation service (e.g., translation of CXL.mem to RDMA (e.g., RoCE, RDMAoF, RDMAoTCP)), among other examples. For instance, the resource notification message may be encapsulated or translated according to the inter-node protocol, transported over the fabric/interconnect coupling the nodes, and then translated at the receiving node to the local connectivity type (e.g., CXL.mem) at the target node. Network processing devices. IPUs may also perform address translations between local memory at the host platform and the target platform and memory addresses shared across the network fabric.

A network processing device may also be provided with node notification logic 905 to process incoming resource notification messages. The node notification logic may take information received in incoming resource notification messages and interface with the software stack (e.g., operating system(s) running in the node) to inform software of the resources and the conditions pertaining to their access and use. In one example, when a resource notification message arrives from a peer network processing device, the local network processing device adds the information provided into a specific area of memory or machine state registers (MSR). In some implementations, a dedicated memory region may be allocated for the storage of shared resource information (e.g., to enhance scalability of a system's support of this architecture), among other example implementations. In some instances, a network processing device can generate a software interrupt and provide, to system software, the pointer where this information is stored. The system software stack may add new memory to be mapped into local memory address space with corresponding memory mapping rules, among other example implementations. The system software stack may be responsible for advertising the available shareable resources (e.g., for reference and application by software programs launched using the platforms) and include newly added resources in the advertisement. The advertisement may be based on and include the conditions, rules and policies determined for each respective shareable resource. Software (e.g., applications, microservices, etc.) may then utilize the information in this advertisement to make requests to access and use the advertised shared resources, allowing CXL networks to be constructed, resized, and recalibrated dynamically, as introduced above, utilizing these shared resources in connection with various applications or services launched in the system.

An enhanced network processing device (e.g., 801) may additionally include a remote resource handshake logic 915 that handles requests from the system software stack(s) on its cluster to access and use shareable resources on other nodes. The software stack may initiate a request and utilize its network processing device 801 to route a request to the peer network processing device of the platform on which the request resource is hosted. Such request may include information pertaining to the request including the amount of the resource being request for use (e.g., the amount of memory, the amount of compute bandwidth (e.g., VF/VP, etc., any pertinent performance hints (e.g., latency or bandwidth), functional hints and allowances (e.g., requirements for coherency, requests for a guarantee that coherency is to be used for at least a threshold amount of the workload, etc.), the amount of time (e.g., in cycles) the resource is to be used, the CXL protocol(s) that are to be used or can be used for the request, etc. The request may be structured according to the protocol (e.g., tunneling or packaging CXL over the protocol of the fabric) and sent over the fabric from the requesting network processing device to the target network processing device.

A network processing device 801 may utilize its request processing logic 920 to handle incoming requests from peer network processing devices requesting access to a resource hosted on the platform of the network processing device 801. On arrival, the network processing device 801 may validate the request (e.g., using resource configuration 965) to determine whether the request complies with policies and conditions (e.g., set by the system management entity or the receiving network processing device itself) governing permitted accesses of the request. Validation can include identifying whether the request or its requesting entity have the requisite privileges to access the resource. Additionally, the network processing device can determine whether sufficient capacity remains of the resource to allow the requested accesses (e.g., sufficient compute capacity, sufficient memory, etc.). In some implementations, if access is validated and granted, an indication may be returned (e.g., the address of the resource (e.g., the base physical address for a shared memory resource)). Accordingly, the requesting and receiving network processing devices complete a "handshake" to confirm the availability and validity of a request to access a shared resource. Upon granting the request, the network processing device may further validate that the corresponding specific CXL request resulting from a successful handshake remains in compliance with the agreed upon conditions for the access. For instance, the network processing device may check to ensure that the request utilizes the specified CXL protocol for the connection (e.g., as set forth by the ACL 960). The network processing device may additionally determine whether adaptive, dynamic protocol changes are allowed and/or needed for the request (e.g., to meet performance targets corresponding to the request (e.g., as established during the handshake with the requesting network processing device)). Additionally, the network processing device may check to see if the request corresponds to a baseboard management controller (BMC) request (e.g., a CXL.BMC request). If so, the network processing device 801 may route the request to the BMC 955.

Various policies determined for accessing a particular shared resource may be enforced by a network processing device for the cluster that includes the particular shared resource. Such policies may be leveraged to enable software to construct various CXL networks that interconnect devices requesting and using the shared resource, including devices on other clusters. For instance, CXL networks may be constructed to interconnect devices between two or more clusters through their respective network processing devices and resources may be shared between devices in the clusters. Further, different combinations of CXL protocols (or "sub-protocols") may be utilized in these different networks based on the policies established and the particular needs and design of programs (e.g., applications, services, microservices, etc.) for which the CXL networks are configured and established. In this manner, CXL and network processing device may be leveraged to build an endless variety of networks from the same devices in the same interconnected platforms to facilitate a wide range of applications.

Figure 10:
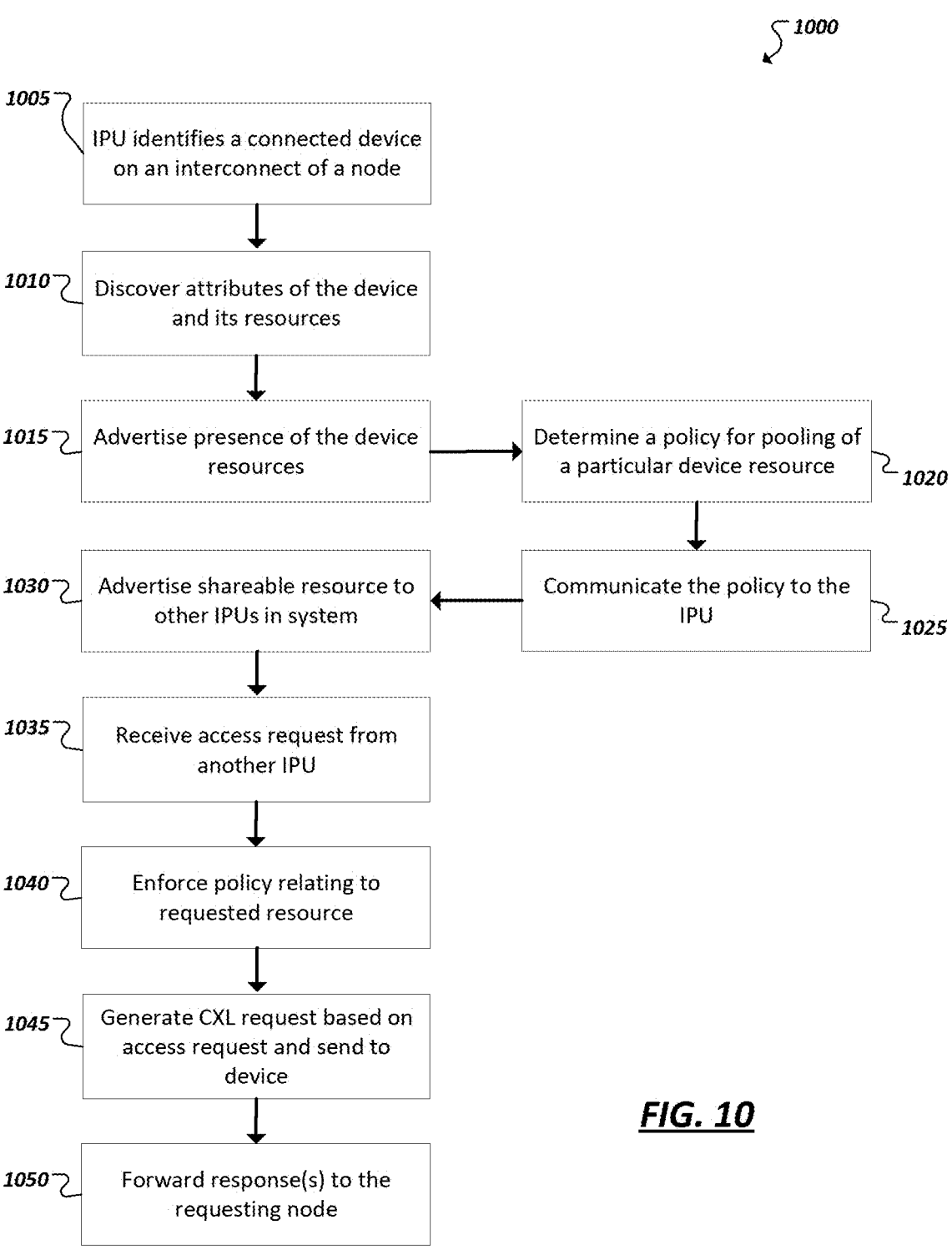
FIG. 10 is a simplified flow diagram illustrating an example technique for configuring a network.

Turning to FIG. 10, a simplified flow diagram 1000 is shown illustrating an example technique utilizing a first network processing device in a first platform (or cluster) coupled to a second network processing device in a second platform. For instance, the first network processing device may identify 1005 a particular device connected to the first network processing device by an interconnect compliant with CXL. The first network processing device may utilize this connection to identify 1010 attributes of the particular device, including its identifier, type, and included resources (e.g., compute resources, memory resources, I/O resources, etc.). The first network processing device may advertise 1015 the presence of the particular device, together with its identified attributes, to a system management entity. The system management entity may determine 1020 a policy for the including the one or more of the resources of the particular device in a CXL-enabled resource pool (or "sharing" of the resource within the system) based on the attributes identified in the advertisement 1015. The policy may identify whether or not the resource is shareable at all and, if so, under what conditions (e.g., the identity or capabilities of the device attempting to access the resource, the sub-protocols used to access the resource, the amount of the resource that may be shared, the frequency or duration that sharing is allowed, and so on). This policy may be communicated 1025 to the first network processing device. The shareable nature of the resource may also be communicated 1030 to other devices and/or network processing devices in other platforms within the system to notify these devices and/or system software of the potential availability of the resource.

Various CXL networks may be constructed based on the availability of various shared resources identified among interconnect platforms in the system, as well as the corresponding policies determined for the sharing of these resources. Within such a network, one device in one cluster (e.g., a second platform) may request access to a particular shareable resource (e.g., read or write to memory of a shared memory resource, request a thread to be run on a particular execution unit or other shared compute resource, etc.). The request may be sent to its local, second network processing device and the second network processing device may forward the request (and potentially translate the request) as an access request to the first network processing (e.g., sent over an Ethernet or other connection coupling the first network processing device and second network processing device). The first network processing device may receive 1035 the access request and determine 1040 a policy governing access to the resource requested in the access request. The first network processing device may then determine whether this particular access request should be granted based on the policy and, if allowed, generate 1045 a request according to one of the CXL sub-protocols (e.g., CXL.io, CXL.mem, or CXL.cache) to send to the device hosting the resource in the platform. Responses associated with the request may be generated by the device and sent over the CXL link to the first network processing device and the first network processing device may likewise forward the response 1050 to the second network processing device where appropriate, among other actions to facilitate the requested access. Given the flexible nature of CXL networks that may be constructed within such architectures, access requests may be handled differently based on the resource requested, the nature or identity of the device requesting the access, performance conditions set for the network or the program using the network, among other example factors.

Figure 11:
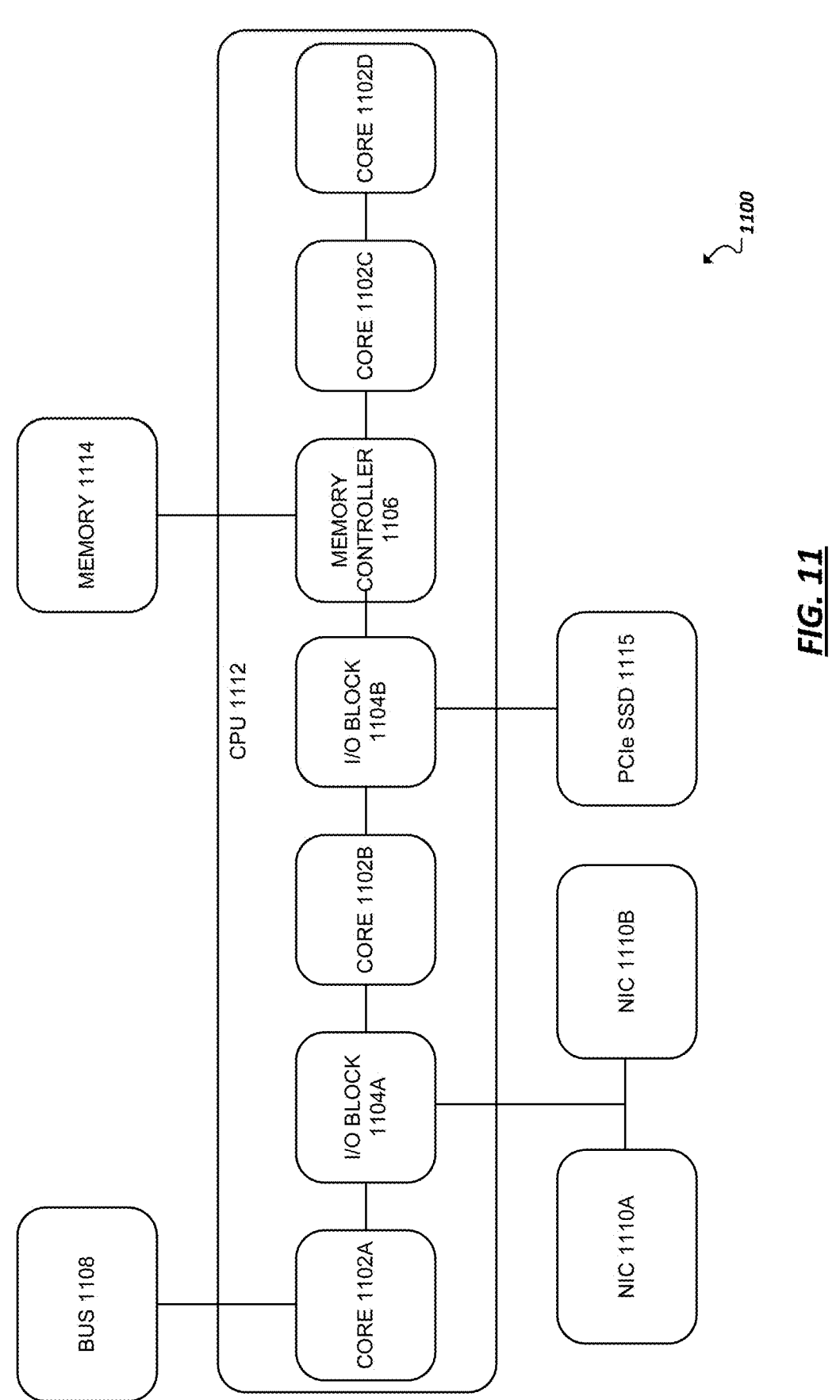
FIG. 11 illustrates a block diagram of an example processor device in accordance with certain embodiments.

Note that the apparatus', methods', and systems described above may be implemented in any electronic device or system as aforementioned. As a specific illustration, FIG. 11 provides an exemplary implementation of a processing device such as one that may be included in a network processing device. It should be appreciated that other processor architectures may be provided to implement the functionality and processing of requests by an example network processing device, including the implementation of the example network processing device components and functionality discussed above. Further, while the examples discussed above focus on the use of CXL and CXL-based resource pooling, it should be appreciated that reference to CXL is as an illustrative example only. Indeed, the more generalized concepts disclosed herein may be equally and advantageously applied to other interconnects and interconnect protocols that facilitate similar resource pooling, among other examples.

Referring to FIG. 11, a block diagram 1100 is shown of an example data processor device (e.g., a central processing unit (CPU)) 1112 coupled to various other components of a platform in accordance with certain embodiments. Although CPU 1112 depicts a particular configuration, the cores and other components of CPU 1112 may be arranged in any suitable manner. CPU 1112 may comprise any processor or processing device, such as a microprocessor, an embedded processor, a digital signal processor (DSP), a network processor, an application processor, a co-processor, a system on a chip (SOC), or other device to execute code. CPU 1112, in the depicted embodiment, includes four processing elements (cores 1102 in the depicted embodiment), which may include asymmetric processing elements or symmetric processing elements. However, CPU 1112 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical CPU 1112, as illustrated in FIG. 11, includes four cores—cores 1102A, 1102B, 1102C, and 1102D, though a CPU may include any suitable number of cores. Here, cores 1102 may be considered symmetric cores. In another embodiment, cores may include one or more out-of-order processor cores or one or more in-order processor cores. However, cores 1102 may be individually selected from any type of core, such as a native core, a software managed core, a core adapted to execute a native Instruction Set Architecture (ISA), a core adapted to execute a translated ISA, a co-designed core, or other known core. In a heterogeneous core environment (e.g., asymmetric cores), some form of translation, such as binary translation, may be utilized to schedule or execute code on one or both cores.

A core 1102 may include a decode module coupled to a fetch unit to decode fetched elements. Fetch logic, in one embodiment, includes individual sequencers associated with thread slots of cores 1102. Usually a core 1102 is associated with a first ISA, which defines/specifies instructions executable on core 1102. Often machine code instructions that are part of the first ISA include a portion of the instruction (referred to as an opcode), which references/specifies an instruction or operation to be performed. The decode logic may include circuitry that recognizes these instructions from their opcodes and passes the decoded instructions on in the pipeline for processing as defined by the first ISA. For example, as decoders may, in one embodiment, include logic designed or adapted to recognize specific instructions, such as transactional instructions. As a result of the recognition by the decoders, the architecture of core 1102 takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores 1102, in one embodiment, recognize the same ISA (or a subset thereof). Alternatively, in a heterogeneous core environment, a decoder of one or more cores (e.g., core 1102B) may recognize a second ISA (either a subset of the first ISA or a distinct ISA).

In various embodiments, cores 1102 may also include one or more arithmetic logic units (ALUs), floating point units (FPUs), caches, instruction pipelines, interrupt handling hardware, registers, or other suitable hardware to facilitate the operations of the cores 1102.

Bus 1108 may represent any suitable interconnect coupled to CPU 1112. In one example, bus 1108 may couple CPU 1112 to another CPU of platform logic (e.g., via UPI). I/O blocks 1104 represents interfacing logic to couple I/O devices 1110 and 1115 to cores of CPU 1112. In various embodiments, an I/O block 1104 may include an I/O controller that is integrated onto the same package as cores 1102 or may simply include interfacing logic to couple to an I/O controller that is located off-chip. As one example, I/O blocks 1104 may include PCIe interfacing logic. Similarly, memory controller 1106 represents interfacing logic to couple memory 1114 to cores of CPU 1112. In various embodiments, memory controller 1106 is integrated onto the same package as cores 1102. In alternative embodiments, a memory controller could be located off chip.

As various examples, in the embodiment depicted, core 1102A may have a relatively high bandwidth and lower latency to devices coupled to bus 1108 (e.g., other CPUs 1112) and to NICs 1110, but a relatively low bandwidth and higher latency to memory 1114 or core 1102D. Core 1102B may have relatively high bandwidths and low latency to both NICs 1110 and PCIe solid state drive (SSD) 1115 and moderate bandwidths and latencies to devices coupled to bus 1108 and core 1102D. Core 1102C would have relatively high bandwidths and low latencies to memory 1114 and core 1102D. Finally, core 1102D would have a relatively high bandwidth and low latency to core 1102C, but relatively low bandwidths and high latencies to NICs 1110, core 1102A, and devices coupled to bus 1108.

"Logic" (e.g., as found in I/O controllers, power managers, latency managers, etc. and other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g., reset, while an updated value potentially includes a low logical value, e.g., set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: a network processing device including: a first interface to couple to a first one of a set of devices in a cluster via a first interconnect, where the first device includes a set of resources, the first interface supports a plurality of protocols, and the plurality of protocols include a memory protocol and a cache coherent protocol; an second interface to couple to another network processing device associated with another cluster; and circuitry to: identify attributes of the set of resources of the first device; determine, based on the attributes, that a portion of the set of resources can be shared with the other cluster using one or more of the plurality of protocols; receive an access request, from a second device in the other cluster, to access a particular resource in the portion of the set of resources; and send a request to the first device, where the request corresponds to the access request and is based on one of the plurality of protocols.

Example 2 includes the subject matter of example 1, where the circuitry is further to send a message to the other network processing device to advertise that the portion of the set of resources include shareable resources.

Example 3 includes the subject matter of example 2, where the message is to identify conditions for access to the portion of the set of resources by requesting devices outside the cluster.

Example 4 includes the subject matter of example 3, where the conditions include at least one of a type of the requesting device, an amount of the portion of the set of resources that may be shared, or a particular one of the plurality of protocols to be used during sharing of the resource.

Example 5 includes the subject matter of any one of examples 1-4, where the plurality of protocols include a plurality of Compute Express Link (CXL) protocols, the memory protocol includes CXL.mem, and the cache coherent protocol includes CXL.cache.

Example 6 includes the subject matter of any one of examples 1-5, where the circuitry is further to select one of the memory protocol or the cache protocol for the request.

Example 7 includes the subject matter of any one of examples 1-6, where the circuitry is further to: send an advertisement message to a system management entity, where the advertisement message identifies the first device and the attributes; and receive a policy message from the system management entity based on the advertisement message, where the policy message identifies that the portion of the set of resources can be shared.

Example 8 includes the subject matter of any one of examples 1-7, where the first cluster includes a first data center cluster and the second cluster includes a second data center cluster.

Example 9 includes the subject matter of any one of examples 1-8, where the particular resource includes a memory of the first device.

Example 10 includes the subject matter of any one of examples 1-9, where the particular resource includes a compute resource of the first device.

Example 11 is a method including: receiving an indication, at a network processing device, that a resource of a first device is shareable, where the first device is coupled to the network processing device by a first interconnect in a first platform, the network processing device couples to another network processing device of a second platform via a second interconnect, the first interconnect supports a plurality of protocols, and the plurality of protocols include a memory protocol and a cache coherent protocol; receiving an access request, from a second device in the second platform, to access the resource of the first device; determining a policy for access to the resource by the second device based on the indication; and sending a request to the first device over the first interconnect, where the request corresponds to the access request and is based on the policy.

Example 12 includes the subject matter of example 11, where the request is according to one of the memory protocol or the cache coherent protocol based on the policy.

Example 13 includes the subject matter of example 12, where the request includes a first request, the cache coherent protocol is used for the first request, and the method further includes: receiving a second access request from the second device to access the resource; and sending a second request to the first device over the first interconnect, where the memory protocol is used for the second request based on the policy.

Example 14 includes the subject matter of any one of examples 11-13, where the indication is received from a management entity of a system and the system includes the first platform and the second platform.

Example 15 includes the subject matter of example 14, further including: identifying the first device; identifying the resource of the first device and attributes of the resource; and advertising the resource to the management entity, where the indication is received based on advertising the resource.

Example 16 includes the subject matter of example 15, where the management entity includes a centralized management entity.

Example 17 includes the subject matter of example 15, where the management entity is implemented partially on the network processing device.

Example 18 includes the subject matter of any one of examples 11-17, where the policy defines conditions for access of the resource, and the conditions include at least one of a type of the requesting device, an amount of the portion of the set of resources that may be shared, or a particular one of the plurality of protocols to be used during sharing of the resource.

Example 19 includes the subject matter of any one of examples 11-18, where the plurality of protocols include a plurality of Compute Express Link (CXL) protocols, the memory protocol includes CXL.mem, and the cache coherent protocol includes CXL.cache.

Example 20 includes the subject matter of example 19, where the access is to be shared through a CXL resource pool.

Example 21 is a system including means to perform the method of any one of examples 11-20.

Example 22 includes the subject matter of example 21, where the means include a computer readable storage medium with instructions stored thereon, the instructions executable by a processor to perform at least a portion of the method of any one of examples 11-20.

Example 23 is a system including: a first node including: a first network processing device; and a first set of devices coupled to the first network device by a first set of links, where the first set of links use a first interconnect protocol, the first interconnect protocol defines a memory sub-protocol and a cache coherent sub-protocol; a second node including; a second network processing device coupled to the first network processing device by an interconnect; and a second set of devices coupled to the second network device by a second set of links, where the second set of links use the first interconnect protocol, where the first network processing device is to: determine a policy for sharing a resource of a particular one of the first set of devices; receive an access request from the second network processing device for a second device in the second set of devices to access the resource; and generate a request according to the first interconnect protocol to send to the particular device, where the request corresponds to the access request and is based on the policy.

Example 24 includes the subject matter of example 23, where one of the first network processing device or the second network processing device includes an infrastructure processing unit (IPU).

Example 25 includes the subject matter of any one of examples 23-24, where the first set of devices includes at least one of a host processor, an accelerator, or memory expander.

Example 26 includes the subject matter of any one of examples 23-25, where the interconnect uses a different interconnect protocol.

Example 27 includes the subject matter of any one of examples 23-26, further including a system manager executable to: configure a first network to include the first device and the second device in association with a first program, where the resource is accessible to the second device in the first network; and configure a different second network to include the first device and the second device in association with a different second program, where the resource is also accessible to the second device in the second network.

Example 28 includes the subject matter of example 27, where a first plurality of devices are interconnected in the first network by links according to the first interconnect protocol, and a different second plurality of devices are interconnected in the second network by links according to the first interconnect protocol.

Example 29 includes the subject matter of example 27, where access to the resource by the second device is provided by a link using the memory subprotocol in the first network and access to the resource by the second device is provided the cache coherent subprotocol in the second network.

Example 30 includes the subject matter of any one of examples 23-29, where the policy permits alternating between the memory sub-protocol and the cache coherent sub-protocol for requests to access the resource.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a network processing device comprising:
a first interface to couple to a first one of a set of devices in a cluster via a first interconnect, wherein the first device includes a set of hardware resources, the first interface supports a plurality of interconnect protocols, and the plurality of interconnect protocols comprise a memory interconnect protocol and a cache coherent interconnect protocol;
a second interface to couple to another network processing device associated with another cluster;
circuitry to:
identify attributes of the set of hardware resources of the first device;
determine, based on the attributes, that a portion of the set of hardware resources can be shared with the other cluster using one or more of the plurality of interconnect protocols;
receive an access request, from a second device in the other cluster, to access a particular hardware resource in the portion of the set of hardware resources; and
send a request to the first device, wherein the request corresponds to the access request and is based on one of the plurality of interconnect protocols.

2. The apparatus of claim 1, wherein the circuitry is further to send a message to the other network processing device to advertise that the portion of the set of hardware resources comprise shareable resources.

3. The apparatus of claim 2, wherein the message is to identify conditions for access to the portion of the set of hardware resources by requesting devices outside the cluster.

4. The apparatus of claim 3, wherein the conditions comprise at least one of a type of the requesting device, an amount of the portion of the set of hardware resources that may be shared, or a particular one of the plurality of interconnect protocols to be used during sharing of the hardware resource.

5. The apparatus of claim 1, wherein the plurality of interconnect protocols comprises a plurality of Compute Express Link (CXL) protocols, the memory interconnect protocol comprises CXL.mem, and the cache coherent interconnect protocol comprises CXL.cache.

6. The apparatus of claim 1, wherein the circuitry is further to select one of the memory interconnect protocol or the cache coherent interconnect protocol for the request.

7. The apparatus of claim 1, wherein the circuitry is further to:
send an advertisement message to a system management entity, wherein the advertisement message identifies the first device and the attributes; and
receive a policy message from the system management entity based on the advertisement message, wherein the policy message identifies that the portion of the set of hardware resources can be shared.

8. The apparatus of claim 1, wherein the first cluster comprises a first data center cluster and the second cluster comprises a second data center cluster.

9. The apparatus of claim 1, wherein the particular hardware resource comprises a memory of the first device.

10. The apparatus of claim 1, wherein the particular hardware resource comprises a compute resource of the first device.

11. A method comprising:

receiving an indication, at a network processing device, that a hardware resource of a first device is shareable, wherein the first device is coupled to the network processing device by a first interconnect in a first platform, the network processing device couples to another network processing device of a second platform via a second interconnect, the first interconnect supports a plurality of interconnect protocols, and the plurality of interconnect protocols comprise a memory interconnect protocol and a cache coherent interconnect protocol;

receiving an access request, from a second device in the second platform, to access the hardware resource of the first device;

determining a policy for access to the hardware resource by the second device based on the indication; and sending a request to the first device over the first interconnect, wherein the request corresponds to the access request and is based on the policy.

12. The method of claim 11, wherein the request is according to one of the memory interconnect protocol or the cache coherent interconnect protocol based on the policy.

13. The method of claim 12, wherein the request comprises a first request, the cache coherent interconnect protocol is used for the first request, and the method further comprises:

receiving a second access request from the second device to access the hardware resource; and sending a second request to the first device over the first interconnect, wherein the memory interconnect protocol is used for the second request based on the policy.

14. The method of claim 11, wherein the indication is received from a management entity of a system and the system comprises the first platform and the second platform.

15. A system comprising:

a first node comprising:

a first network processing device; and a first set of devices coupled to the first network device by a first set of links, wherein the first set of links use a first interconnect protocol, the first interconnect protocol defines a memory sub-protocol and a cache coherent sub-protocol;

a second node comprising;

a second network processing device coupled to the first network processing device by an interconnect; and a second set of devices coupled to the second network device by a second set of links, wherein the second set of links use the first interconnect protocol, wherein the first network processing device is to:

determine a policy for sharing a hardware resource of a particular one of the first set of devices;

receive an access request from the second network processing device for a second device in the second set of devices to access the hardware resource;

generate a request according to the first interconnect protocol to send to the particular device, wherein the request corresponds to the access request and is based on the policy.

16. The system of claim 15, wherein one of the first network processing device or the second network processing device comprises an infrastructure processing unit (IPU).

17. The system of claim 15, wherein the first set of devices comprises at least one of a host processor, an accelerator, or memory expander.

18. The system of claim 15, wherein the interconnect uses a different interconnect protocol.

19. The system of claim 15, further comprising a system manager executable to:

configure a first network to include the first device and the second device in association with a first program, wherein the hardware resource is accessible to the second device in the first network; and configure a different second network to include the first device and the second device in association with a different second program, wherein the hardware resource is also accessible to the second device in the second network.

20. The system of claim 19, wherein a first plurality of devices are interconnected in the first network by links according to the first interconnect protocol, and a different second plurality of devices are interconnected in the second network by links according to the first interconnect protocol.

21. The system of claim 19, wherein access to the hardware resource by the second device is provided by a link using the memory subprotocol in the first network and access to the hardware resource by the second device is provided the cache coherent subprotocol in the second network.

22. The system of claim 15, wherein the policy permits alternating between the memory sub-protocol and the cache coherent sub-protocol for requests to access the hardware resource.

* * * * *